(12) United States Patent
Kojima

(10) Patent No.: US 11,258,361 B2
(45) Date of Patent: Feb. 22, 2022

(54) VOLTAGE DETECTION APPARATUS AND IMAGE FORMING APPARATUS

(71) Applicant: CANON KABUSHIKI KAISHA, Tokyo (JP)

(72) Inventor: Keizo Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 16/735,867

(22) Filed: Jan. 7, 2020

(65) Prior Publication Data

US 2020/0228008 A1 Jul. 16, 2020

(30) Foreign Application Priority Data

Jan. 15, 2019 (JP) .............................. JP2019-004385

(51) Int. Cl.
*H02M 3/156* (2006.01)
*H02M 3/335* (2006.01)
*G03G 15/20* (2006.01)
*G03G 15/00* (2006.01)

(52) U.S. Cl.
CPC ........ *H02M 3/156* (2013.01); *G03G 15/2039* (2013.01); *H02M 3/33507* (2013.01); *G03G 15/80* (2013.01)

(58) Field of Classification Search
None
See application file for complete search history.

(56) References Cited

U.S. PATENT DOCUMENTS

| 8,891,997 | B2 | 11/2014 | Samejima | |
|---|---|---|---|---|
| 9,274,490 | B2 | 3/2016 | Kojima | |
| 10,547,244 | B2 | 1/2020 | Odate | |
| 2012/0292543 | A1* | 11/2012 | Kamada | F16K 37/0075 251/129.15 |
| 2013/0064566 | A1 | 3/2013 | Kojima | |
| 2016/0036335 | A1 | 2/2016 | Kojima | |
| 2018/0316269 | A1* | 11/2018 | Shimura | B41J 2/435 |
| 2019/0158776 | A1* | 5/2019 | Chen | H04N 5/63 |
| 2019/0334365 | A1* | 10/2019 | Tian | H02M 3/33507 |

FOREIGN PATENT DOCUMENTS

| JP | H11-344882 | 12/1999 |
|---|---|---|
| JP | 2013-217843 | 10/2013 |

* cited by examiner

*Primary Examiner* — Jeffrey A Gblende
(74) *Attorney, Agent, or Firm* — Venable LLP

(57) ABSTRACT

The voltage detection apparatus includes a reference power supply that outputs a predetermined voltage; a voltage conversion unit that converts detected information into a voltage; and a switching unit that switches between a first state in which the predetermined voltage is supplied from the reference power supply to the primary side of a transmission unit, and a second state in which the voltage resulting from the conversion is supplied from the voltage conversion unit to the primary side of the transmission unit. The switching unit switches to the first state, in which a correction value for correcting a digital value is acquired. The switching unit switches to the second state, in which a voltage value acquired based on the digital value is corrected with the correction value to acquire a corrected voltage value.

23 Claims, 13 Drawing Sheets

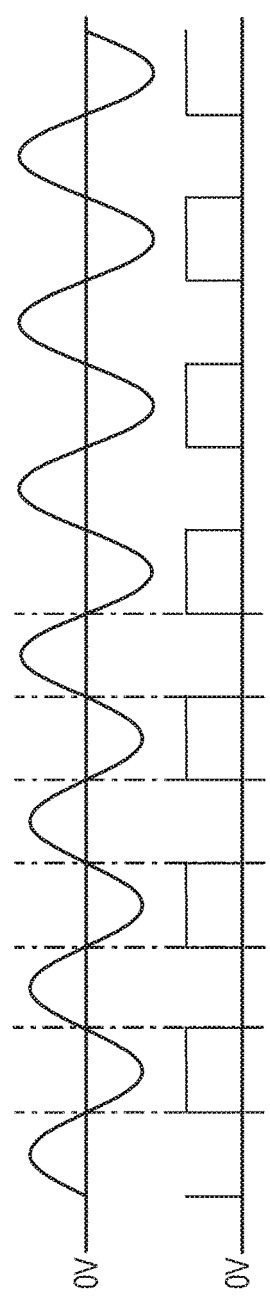
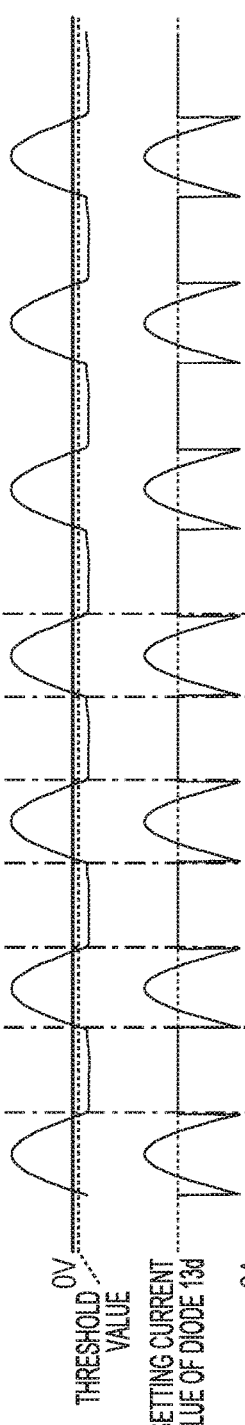
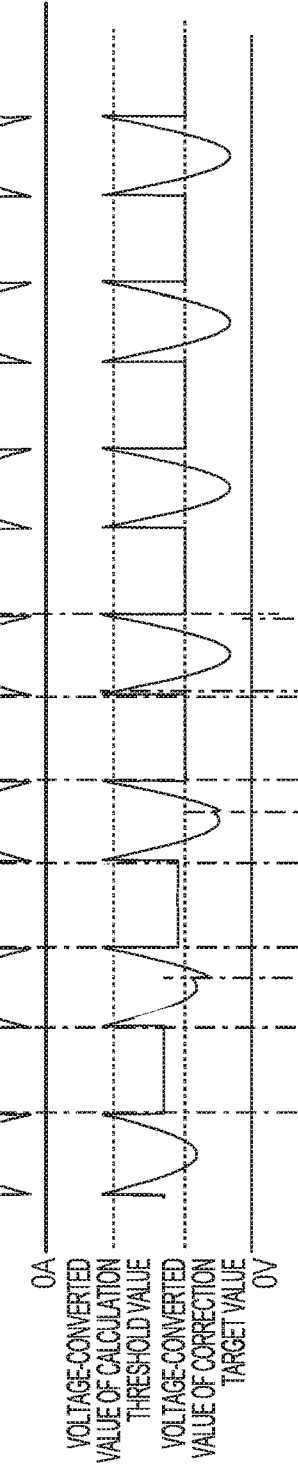
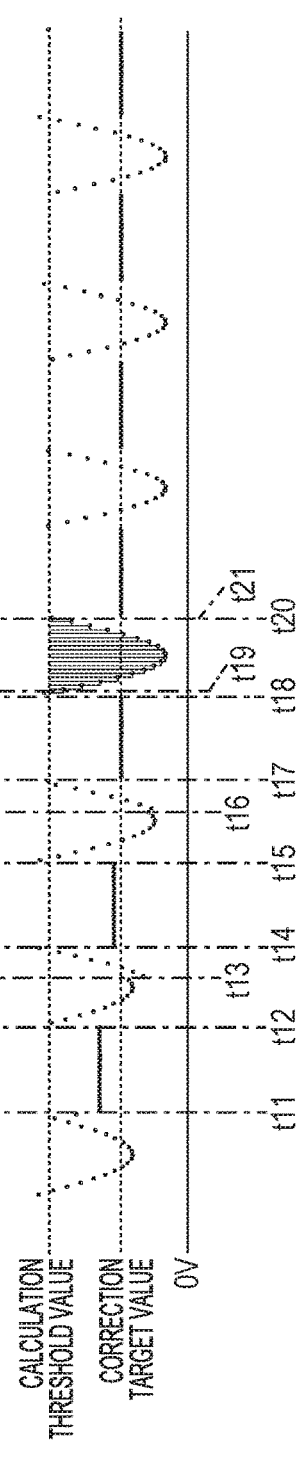

VOLTAGE DETECTION APPARATUS AND IMAGE FORMING APPARATUS

BACKGROUND OF THE INVENTION

Field of the Invention

The present invention relates to voltage detection apparatuses and image forming apparatuses, and in particular to a voltage detection apparatus for transmission between the insulated opposite sides.

Description of the Related Art

Many circuits have been in use that transmit analog voltage information on one of the insulated primary and secondary sides to the other side. As an example, in an image forming apparatus having a heat fixing device to which an alternate current (AC) power supply is connected, the value of input voltage from the AC power supply is detected and used for controlling the heat fixing device. For example, the power to be supplied upon activation of the heat fixing device is determined by a preset duty according to the detected input voltage value and to the target temperature for fixation processing. This allows performing control without overshoot or power shortage, and stopping the operation of the apparatus when abnormal voltage is input. In Japanese Patent Application Laid-Open No. 2013-217843, a zero-crossing signal generated with a photocoupler from the AC voltage of an AC power supply is used to detect the AC voltage of the AC power supply. Conventional power supply voltage detection apparatuses detect the input voltage value of an AC power supply by generating a direct-current (DC) voltage from the DC component of a zero-crossing signal. In this manner, the input voltage of the AC power supply can be detected even if the input voltage value suffers from voltage abnormalities such as sags and noises.

Electronic apparatuses nowadays are used in many countries and regions, which have varying AC power supply conditions. For example, a high-frequency noise may be superimposed, or a voltage drop due to a high line impedance may occur upon a change in load current. Such distorted power supply voltage may cause excessive or insufficient power to be supplied to a heat fixing device, leading to degraded image quality. It is therefore required that a voltage detection apparatus for an AC power supply should detect more accurate voltage information under varying conditions as above. Besides the voltage detection apparatus for detecting the input voltage value of an AC power supply, there are apparatuses in which analog voltage information (hereinafter referred to as primary voltage information) on the primary side is transmitted to the secondary side. One such apparatus is a temperature detection apparatus as described in Japanese Patent Application Laid-Open No. H11-344882. This temperature detection apparatus has a temperature detection member on the primary side, in contrast to the case in a conventional heating apparatus having a heat generation member on the primary side and a temperature detection member on the secondary side. This eliminates the need to secure a distance for safety in the heating apparatus, thereby realizing a compact heating apparatus. This temperature detection apparatus uses optical signals for transmission between the primary side and the secondary side.

However, the above-described conventional configuration of transmission between the insulated primary and secondary sides is significantly affected by the transmission rate between the primary and secondary sides (the current transfer ratio, hereinafter referred to as CTR). If the CTR significantly changes due to conditions such as the temperature condition and the aging condition, the voltage converted and acquired on the secondary side from certain primary voltage information also significantly changes. Further, in a configuration in which a photocoupler is used to generate a zero-crossing signal, a sag or noise in the AC voltage of the AC power supply causes a pulse to occur in the zero-crossing signal at a point different from the original zero-crossing point. The DC voltage generated from the DC component of the zero-crossing signal then becomes lower than it would be. As a result, the detected power supply voltage deviates from the actual AC power supply voltage.

SUMMARY OF THE INVENTION

An aspect of the present invention is a voltage detection apparatus that enables accurate voltage detection.

Another aspect of the present invention is a voltage detection apparatus including a transmission unit whose primary and secondary sides are insulated from each other, the transmission unit configured to transmit information according to a value of an AC voltage from the primary side to the secondary side, a control unit configured to acquire a voltage value corresponding to the detected information, a reference power supply configured to output a predetermined voltage, a voltage conversion unit configured to convert the detected information into a converted voltage, and a switching unit configured to switch between a first state in which the predetermined voltage is supplied from the reference power supply to the primary side of the transmission unit, and a second state in which the converted voltage is supplied from the voltage conversion unit to the primary side of the transmission unit, wherein the control unit control the switching unit to switch a state of the switching unit to the first state to acquire a correction value for correcting the digital value, and control the switching unit to switch the state of the switching unit to the second state to correct the voltage value acquired based on the digital value with the correction value, to acquire a corrected voltage value.

A further aspect of the present invention is an image forming apparatus including an image forming unit configured to form an image, a fixing unit configured to fix the image formed by the image forming unit onto a recording material, and a voltage detection apparatus, the voltage detection apparatus including a transmission unit whose primary and secondary sides are insulated from each other, the transmission unit configured to transmit information according to a value of an AC voltage from the primary side to the secondary side, a control unit configured to acquire a voltage value corresponding to the detected information, a reference power supply configured to output a predetermined voltage, a voltage conversion unit configured to convert the detected information into a converted voltage; and a switching unit configured to switch between a first state in which the predetermined voltage is supplied from the reference power supply to the primary side of the transmission unit, and a second state in which the converted voltage is supplied from the voltage conversion unit to the primary side of the transmission unit, wherein the control unit control the switching unit to switch a state of the switching unit to the first state to acquire a correction value for correcting the digital value, and control the switching unit to switch the state of the switching unit to the second state to correct the voltage value acquired based on the digital value with the correction value, to acquire a corrected voltage value.

Further features of the present invention will become apparent from the following description of exemplary embodiments with reference to the attached drawings.

BRIEF DESCRIPTION OF THE DRAWINGS

FIGS. 7A, 7B, 7C, 7D, 7E and 7F are diagrams for describing operations of the voltage detection apparatus in the second embodiment.

DESCRIPTION OF THE EMBODIMENTS

Specific configurations of the present invention for solving the above-described problems will be described with reference to the following embodiments. The following embodiments are merely exemplary and not intended to limit the technical scope of the present invention to these embodiments. Specifically, for detecting the input voltage of an AC power supply, the present invention regards the input voltage as analog voltage information on the primary side (hereinafter referred to as primary voltage information). However, this is not limiting. For example, for detecting the temperature with a temperature detection element such as a thermistor, voltage based on the temperature detected by the thermistor may be regarded as the primary voltage information. The primary voltage information may also be voltage obtained by converting the primary current flowing through the primary winding of a transformer in an AC/DC converter.

[Voltage Detection Apparatus]

Figure 1:
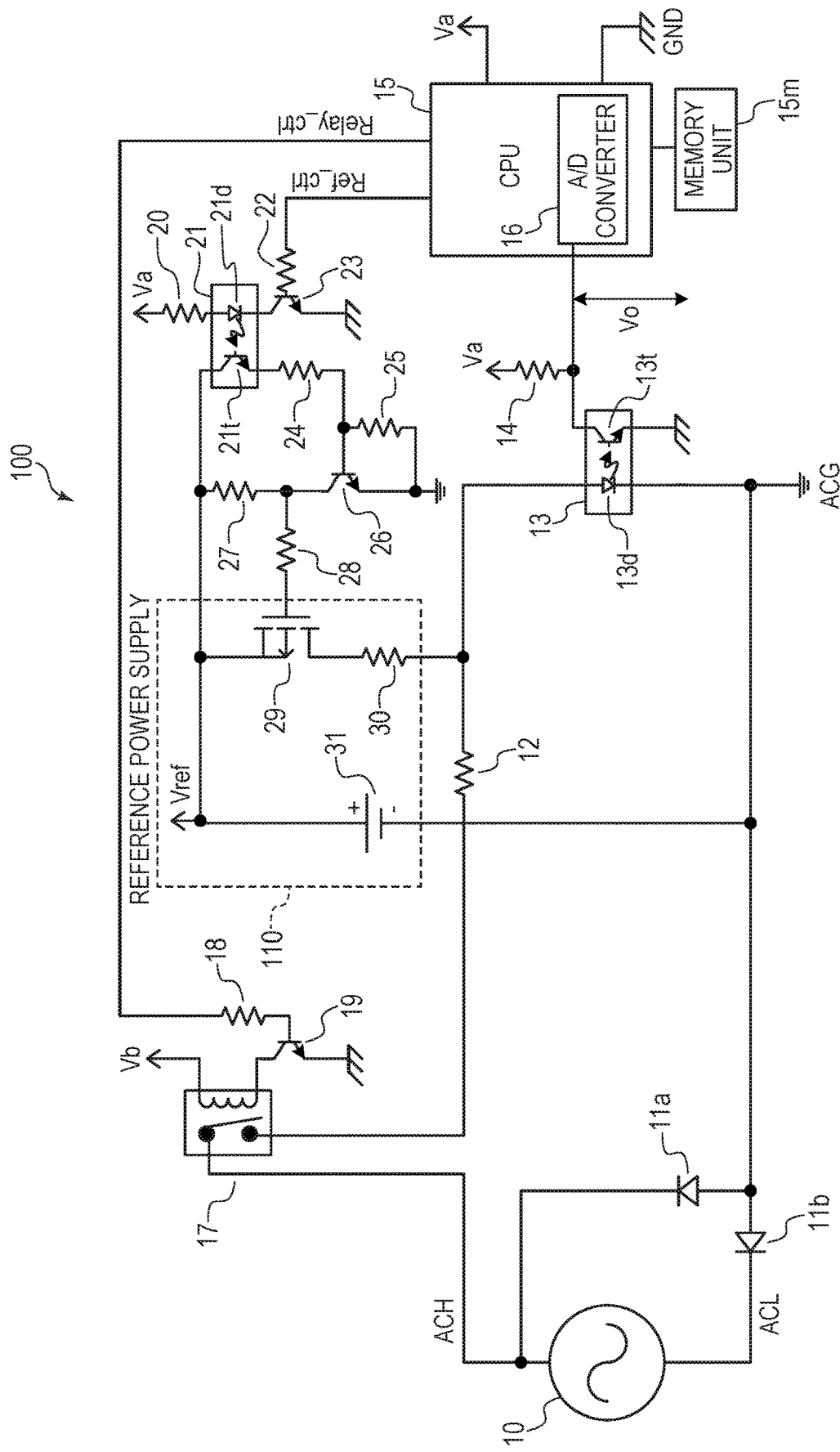
FIG. 1 is a circuit configuration diagram of a voltage detection apparatus in a first embodiment.

FIG. 1 is a diagram for describing the circuit configuration of a voltage detection apparatus for detecting the input voltage of an AC power supply (an alternate current power supply) (hereinafter referred to as an AC power supply voltage) in a first embodiment. The voltage detection apparatus 100 in the first embodiment has an AC power supply 10 as a primary-side input. The voltage detection apparatus 100 transmits AC power supply voltage information to the secondary side through a photocoupler 13, which is an insulating element. The AC power supply voltage information (the analog value of the voltage) transmitted to the secondary side is input to a CPU 15. The photocoupler 13 serves as a transmission unit that transmits primary-side information to the secondary side. In the first embodiment, the detection target (detected information) is the AC voltage of the AC power supply 10. The CPU 15, which is a control unit, calculates the value of the AC power supply voltage (hereinafter referred to as an AC power supply voltage value) VAC based on the input AC power supply voltage information. The voltage detection apparatus 100 also includes a reference power supply 110 and a relay 17. The reference power supply 110 has: a reference voltage 31 referencing a voltage ACG rectified by diodes 11a and 11b; a field-effect transistor (hereinafter denoted as FET) 29; and a resistor 30. The reference voltage 31 is a power supply for supplying a reference voltage 31, which is a predetermined voltage, to the photocoupler 13. The diodes 11a and 11b serve as a rectification unit that half-wave rectifies the AC voltage.

The relay 17, which is a first connection unit, is a relay for supplying and cutting off the voltage from the AC power supply 10. The relay 17 is connected while the AC voltage is supplied to the photocoupler 13, and disconnected while the AC voltage to be supplied to the photocoupler 13 is cut off. The CPU 15 controls turning on and off the reference power supply 110 and the relay 17 in the voltage detection apparatus 100. The CPU 15 also reads information such as a conversion table (to be described below) from a memory unit 15m, and temporarily stores an A/D value (to be described below) in the memory unit 15m for acquiring a peak value (to be described below).

ACH and ACL indicate one line and the other line of the AC power supply 10, respectively. The primary side of the relay 17 is connected to the line ACH. The secondary side of the relay 17 is connected to a power supply Vb and a transistor 19. The transistor 19 has the collector terminal to which the power supply Vb is connected via the secondary side of the relay 17, the base terminal to which the CPU 15 is connected via a resistor 18, and the emitter terminal which is grounded. A diode 13d on the primary side of the photocoupler 13 has the anode to which the primary side of the relay 17 is connected via a resistor 12, and the cathode to which the line ACL is connected via the diode 11b. The resistor 12 is a resistor for limiting the current flowing from the AC power supply 10 to the photocoupler 13. A transistor 13t on the secondary side of the photocoupler 13 has the collector terminal to which a power supply Va is connected via a resistor 14, and the emitter terminal which is grounded. The collector terminal of the transistor 13t is also connected to an analog-to-digital (hereinafter denoted as A/D) converter 16 in the CPU 15. The photocoupler 13 also serves as a voltage conversion unit that converts current flowing to the diode 13d on the primary side into voltage on the secondary side. The A/D converter 16 serves as an analog-to-digital conversion unit that converts the value of analog voltage (a detected voltage Vo) output from the transistor 13t of the photocoupler 13 into a digital value. The CPU 15 acquires the value of the AC voltage of the AC power supply 10 based on the digital value resulting from the conversion by the A/D converter 16.

Between the reference power supply 110 and the CPU 15, a circuit is provided that is used by the CPU 15 to supply and cut off input from the reference power supply 110 to the photocoupler 13. This circuit has a photocoupler 21. A transistor 21t on the primary side of the photocoupler 21 has the emitter terminal to which the base terminal of a transistor 26 is connected via a resistor 24, and the collector terminal to which a reference voltage Vref is connected. A diode 21d on the secondary side of the photocoupler 21 has the anode to which the power supply Va is connected via a resistor 20, and the cathode to which the collector terminal of a transistor 23 is connected. The transistor 23 has the base terminal to which the CPU 15 is connected via a resistor 22, and the emitter terminal which is grounded. The transistor 26 has the collector terminal to which the reference voltage Vref is connected via a resistor 27, and the emitter terminal which is grounded. A resistor 25 is connected between the base terminal and the emitter terminal of the transistor 26. The gate terminal of the FET 29 is connected via a resistor 28 to the junction of the resistor 27 and the collector terminal of the transistor 26.

The CPU 15 operates with the power supply Va. The CPU 15 controls the relay 17 to be connected or cut off by outputting a high-level (hereinafter denoted as Hi) or low-level (hereinafter denoted as Lo) Relay_ctrl signal to the base terminal of the transistor 19. The CPU 15 controls input from the reference power supply 110 to be provided or not to be provided to the photocoupler 13 by outputting a high-level (hereinafter denoted as Hi) or low-level (hereinafter denoted as Lo) Ref_ctrl signal to the base terminal of the transistor 23.

The CPU 15 sets the Relay_ctrl signal to Lo to turn off the transistor 19 and cut off the relay 17. This prevents the AC power supply voltage from being supplied to the diode 13d on the primary side of the photocoupler 13. The CPU 15 sets the Relay_ctrl signal to Hi to turn on the transistor 19 and connect the relay 17. This allows the AC power supply voltage to be supplied to the diode 13d on the primary side of the photocoupler 13.

The CPU 15 sets the Ref_ctrl signal to Lo to turn off the transistor 23, bring the photocoupler 21 out of conduction, turn off the transistor 26, and turn off the FET 29. This prevents the voltage Vref (the reference voltage 31) from being supplied to the diode 13d on the primary side of the photocoupler 13. The CPU 15 sets the Ref_ctrl signal to Hi to turn on the transistor 23, bring the photocoupler 21 into conduction, turn on the transistor 26, and turn on the FET 29. This allows the voltage Vref (the reference voltage 31) to be supplied to the diode 13d on the primary side of the photocoupler 13.

The FET 29 serves as a second connection unit that supplies or cuts off the voltage of the reference power supply 110 to the photocoupler 13. The FET 29 is connected when the voltage of the reference power supply 110 is supplied to the photocoupler 13, and disconnected when the voltage of the reference power supply 110 to be supplied to the photocoupler 13 is cut off. The relay 17 (the first connection unit) and the FET 29 (the second connection unit) serve as a switching unit that switches between a first state in which the voltage is supplied from the reference power supply 110 to the primary side of the photocoupler 13, and a second state in which the AC voltage is supplied from the AC power supply 10 to the primary side of the photocoupler 13. The detected voltage Vo will be described below.

[Operations in Voltage Detection Apparatus]

Figure 2:
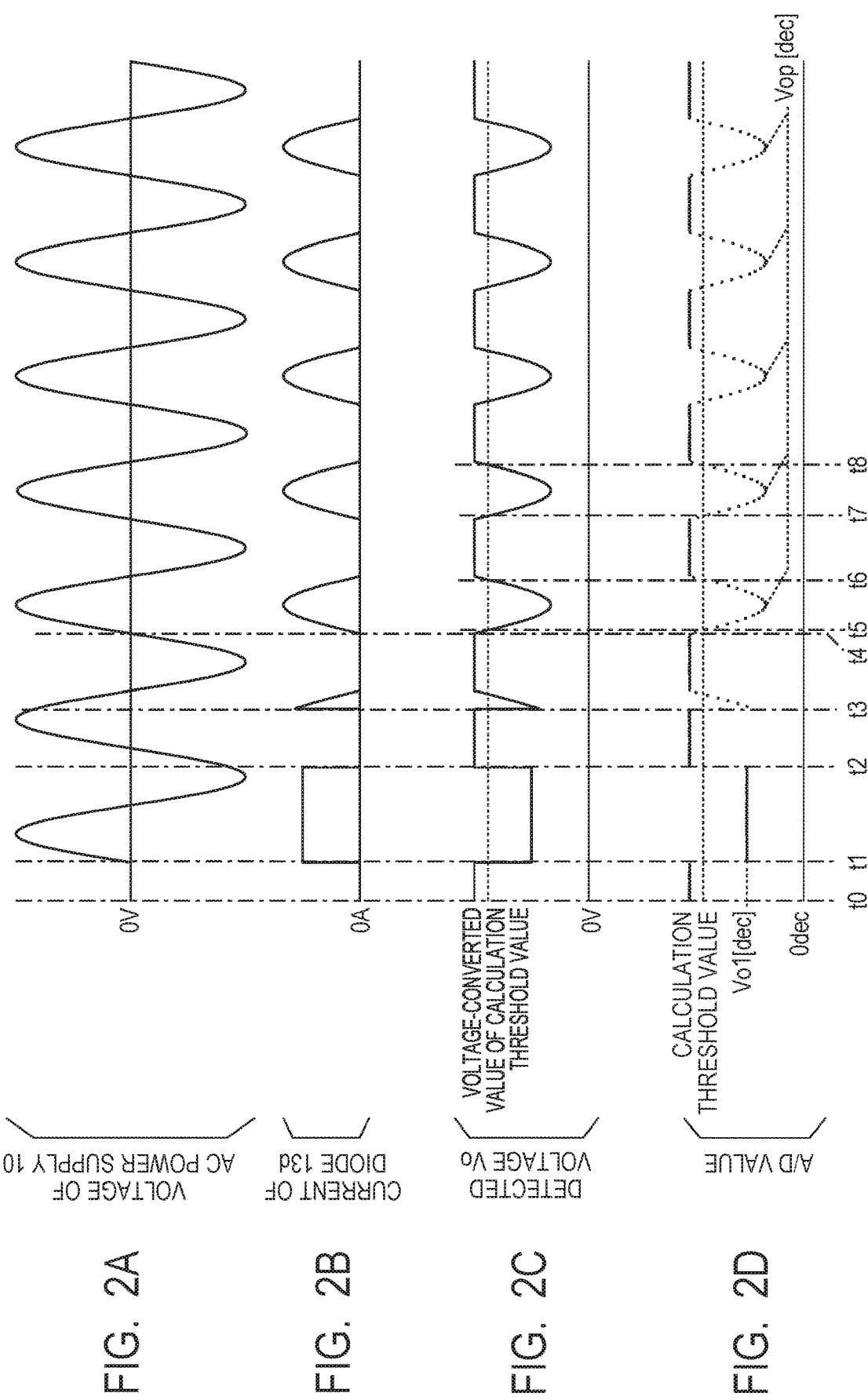
FIGS. 2A, 2B, 2C and 2D are diagrams for describing operations of the voltage detection apparatus in the first embodiment.

FIGS. 2A to 2D are diagrams for describing operations of the components of the voltage detection apparatus 100 in FIG. 1. FIG. 2A illustrates the waveform of the voltage (the AC power supply voltage) of the AC power supply 10. FIG. 2B illustrates the waveform of the current flowing to the diode 13d on the primary side of the photocoupler 13. FIG. 2C illustrates the waveform of the voltage (the voltage before being converted into a digital value) (hereinafter referred to as a detected voltage) Vo input to the CPU 15. The dotted line indicates a calculation threshold value for the A/D converter 16 converted into a voltage (a voltage-converted value). FIG. 2D illustrates the value of the detected voltage Vo converted into a digital value (hereinafter referred to as an A/D value) (in dec) by the A/D converter 16 in the CPU 15. The dotted lines indicate the calculation threshold value and a detected voltage Vo1 (to be described below). The abscissa in each diagram indicates time.

Detailed operations in the voltage detection apparatus 100 in FIG. 1 will be described below with reference to FIGS. 2A to 2D. Time t0 corresponds to an initial state in which the primary-side information is not transmitted to the secondary side. In this initial state, neither the AC power supply 10 nor the reference power supply 110 supplies current to the diode 13d of the photocoupler 13. The CPU 15 therefore maintains the Relay_ctrl signal at Lo to keep the transistor 19 OFF and the relay 17 open (cut off). Also at time t0, the CPU 15 maintains the Ref_ctrl signal at Lo to keep transistor 23 OFF and the FET 29 OFF. This prevents current from flowing to the diode 13d of the photocoupler 13, so that the detected voltage Vo, which is the secondary-side output, is at high level (≈Va). Therefore, if the A/D converter 16 has a resolution of 10 bits, the A/D value output from the A/D converter 16 takes the upper-limit value 1023 or a value near 1023 at time t0.

At time t1, the CPU 15 controls the current from the reference power supply 110 to flow to the diode 13d of the photocoupler 13. Specifically, the CPU 15 sets the Relay_ctrl signal to Lo to cut off the relay 17 and sets the Ref_ctrl signal to Hi to turn on the FET 29, thereby causing the voltage Vref (the reference voltage 31) to be supplied to the photocoupler 13. On the secondary side, in response to the light emitted by the diode 13d, collector current flows to the transistor 13t of the photocoupler 13. This collector current, the power supply Va, and the resistor 14 determine the detected voltage Vo in the first embodiment. However, even if the value of the current flowing to the diode 13d is unchanged, the collector current flowing to the transistor 13t varies due to conditions such as aging of the photocoupler 13 and the temperature environment in which the apparatus is used. This causes a significant variation in detected voltage Vo. It is therefore needed to correct such a variation due to the temperature characteristics and aging of the voltage detection apparatus 100.

In the first embodiment, the period from time t1 to time t2 is a correction period for correcting a variation in detected voltage Vo due to the temperature characteristics and aging of the voltage detection apparatus 100. In the period from time t1 to time t2, the CPU 15 converts an input detected voltage Vo into an A/D value through the A/D converter 16. Based on the A/D value resulting from the conversion by the A/D converter 16, the CPU 15 detects the AC power supply voltage value. Hereinafter, converting a detected voltage Vo into an A/D value by the CPU 15 through the A/D converter 16 will be expressed as reading a detected voltage Vo, and the resulting A/D value will be expressed as a read A/D value. In the first embodiment, settings are made such that the A/D value acquired in the correction period from time t1 to time t2 is equal to the A/D value observed when the voltage of the AC power supply 10 is 110 V (a predetermined value).

Here, Iref will denote the current flowing from the reference power supply 110 to the diode 13d while the CPU 15 maintains the Relay_ctrl signal at Lo and the Ref_ctrl signal at Hi. Also, Iac will denote the peak current flowing from the AC power supply 10 to the diode 13d while the CPU 15 maintains the Relay_ctrl signal at Hi and the Ref_ctrl signal at Lo. The current Iref and the current Iac are set to be equal. It is also assumed that other resistance components, such as forward voltage of the diodes (11a, 11b and 13d) and voltage drops due to the ON-resistance of the FET 29, are ignored. The above currents can then be adjusted by having the relationship in Equation (1) among the reference voltage 31 and the resistor 30 in the reference power supply 110, and the resistor 12. In Equation (1), V31 denotes the reference voltage 31, R30 denotes the resistor 30, and R12 denotes the resistor 12.

$$Iac=110/\sqrt{2}/R12=Iref=V31/R30 \quad (1)$$

In this manner, allowing Equation (1) to hold for the predetermined specific AC power supply voltage value can correct a detection variation due to the temperature characteristics and aging of the voltage detection apparatus 100. In the case of FIGS. 2A to 2D, Vol [dec] denotes the A/D value observed when Equation (1) holds, and it is indicated by a dotted line in the diagram of A/D value.

[Correction Method]

Figure 3:
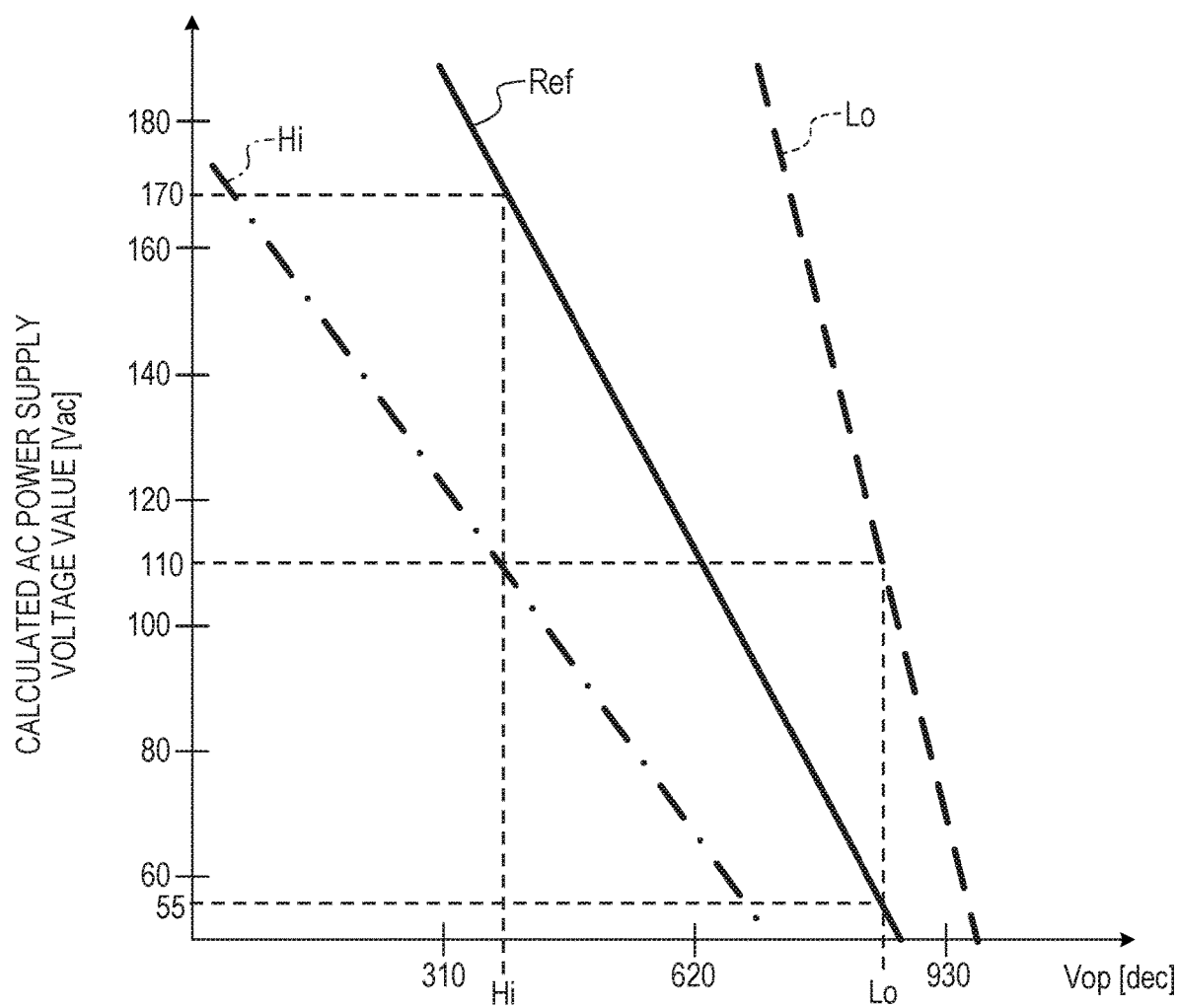
FIG. 3 is a graph illustrating the characteristics of calculated values in the first embodiment.

The correction method for calculating the AC power supply voltage value VAC while correcting a detection variation due to the temperature characteristics and aging of the voltage detection apparatus 100 in the first embodiment will be described with reference to FIGS. 3 and 4. Here, Vac will denote the uncorrected AC power supply voltage value, and VAC will denote the corrected AC power supply voltage value. FIG. 3 graphically illustrates tables for converting an A/D value into the AC power supply voltage value Vac. In the graph illustrated in FIG. 3, Vop [dec] on the abscissa indicates the peak value of A/D values obtained by continuously reading the detected voltage Vo, and corresponds to Vop [dec] shown in the diagram of A/D value in FIG. 2D. How to calculate the peak value Vop [dec] will be described below in the description of the period from time t5 to time t6. The CPU 15 stores, in the memory unit 15m, only a reference conversion table (Ref) shown by a solid line in FIG. 3. The other tables illustrated by a dashed line (Lo) and a dashed and single-dotted line (Hi) in FIG. 3 are obtained based on A/D values read by the A/D converter 16 and on correction coefficients, which are correction values in FIG. 4 (to be described below). The tables shown as Lo and Hi are therefore not stored in advance in the memory unit 15m. For simplicity, in FIG. 3, Ref indicates the transmission characteristic equal to the reference conversion table; Lo indicates a transmission characteristic observed when the transmission efficiency of the photocoupler 13 is lower than the reference transmission efficiency; and Hi indicates a transmission characteristic observed when the transmission efficiency of the photocoupler 13 is higher than the reference transmission efficiency.

Figure 4:
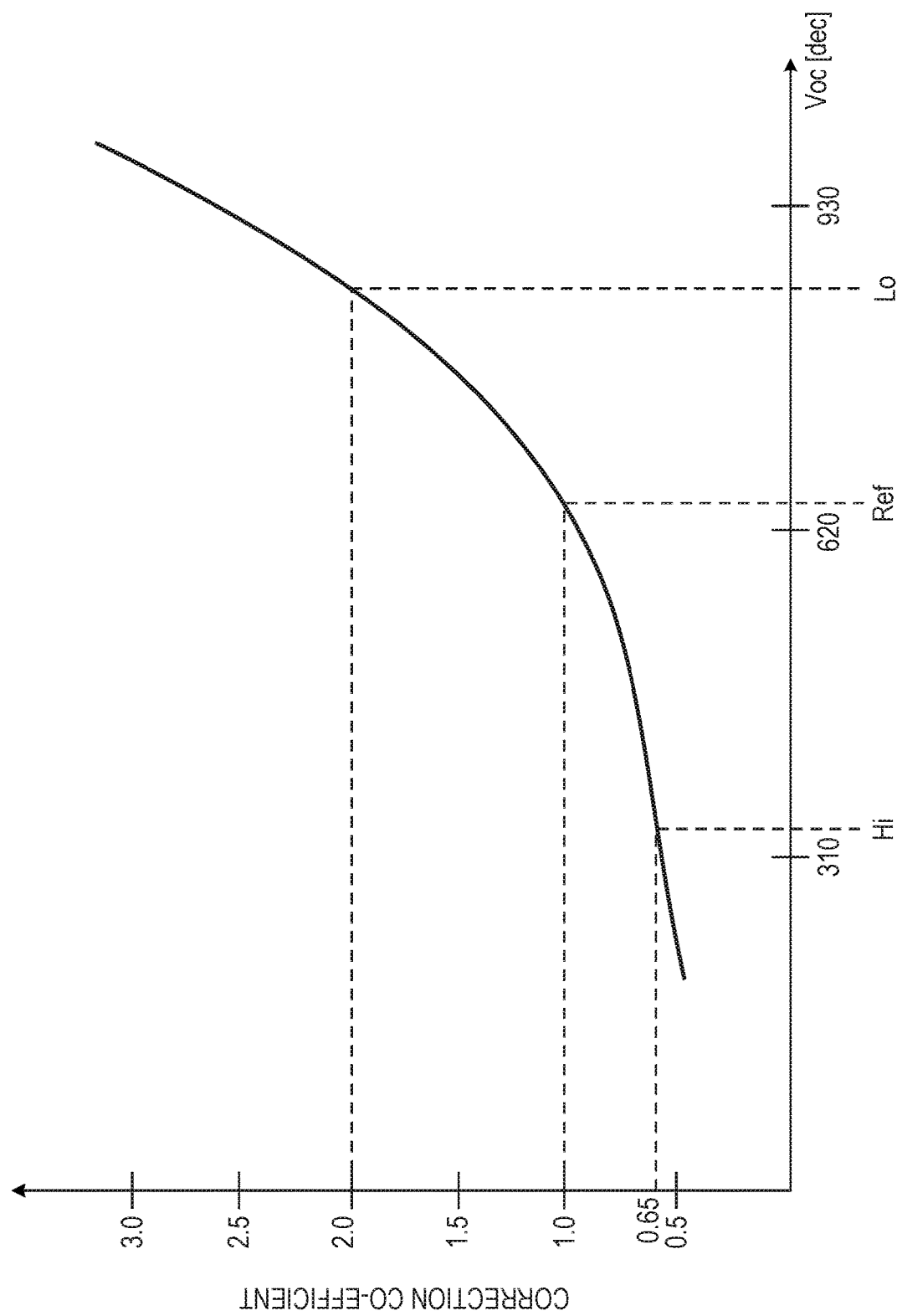
FIG. 4 is a graph for describing correction coefficients in the first embodiment.

FIG. 4 graphically illustrates the correction coefficient for calculating, from the AC power supply voltage value Vac, the AC power supply voltage value VAC corrected for a variation. In FIG. 4, the abscissa indicates Voc, which is the A/D value read from the detected voltage Vo in the correction period, and the ordinate indicates the correction coefficient. FIG. 4 illustrates correction coefficients for use in determining the AC power supply voltage values VAC for different transmission efficiencies such as Lo and Hi from the AC power supply voltage values Vac obtained with the conversion table Ref illustrated in FIG. 3. As in FIG. 3, FIG. 4 also illustrates Ref, Lo and Hi. The conversion table for Ref will hereinafter be referred to as a Ref conversion table.

As described above, Equation (1) holds during the correction period from t1 to t2. However, the transmission efficiency between the primary and secondary sides of the photocoupler 13 varies due to the continuous use and the temperature environment. Even in the correction period in which Equation (1) holds, the detected voltage Vo and the A/D value resulting from converting the detected voltage Vo may not be necessarily constant. The CPU 15 therefore performs correction as follows by assuming that Voc [dec], which is the A/D value read in the correction period, corresponds to a peak voltage of 110 Vac.

First, the correction coefficient in FIG. 4 is determined in the period in which the current Iref flows from the reference power supply 110 to the diode 13d of the photocoupler 13, that is, the correction period from time t1 to time t2 in FIGS. 2A to 2D. Specifically, the CPU 15 determines the correction coefficient illustrated in FIG. 4 from Voc [dec], which is the A/D value read in the correction period from time t1 to time t2 in FIGS. 2A to 2D. The correction coefficient is set such that it takes the value 1 for the reference transmission efficiency, i.e., when Voc is Vol. The A/D value Voc observed when Voc is Vol is illustrated as Ref in FIG. 4. For example, if Voc (the A/D value read in the correction period) is the A/D value Hi, the correction coefficient is 0.65. If the Voc (the A/D value read in the correction period) is the A/D value Lo, the correction coefficient is 2.0.

Z will denote the correction coefficient determined from the A/D value Voc read in the correction period and from FIG. 4. The uncorrected AC power supply voltage Vac is determined from the peak value Vop and the Ref conversion table in FIG. 3. If the determined AC power supply voltage value Vac is expressed as a linear equation as Equation (2), the corrected AC power supply voltage value VAC is obtained with Equation (3).

$$Vac=a\times Vop[dec]+b \quad (2)$$

Vop [dec]: the peak value of continuously read A/D values $$VAC=Vac\times Z \quad (3)$$

For example, in the correction period from time t1 to time t2 in FIGS. 2A to 2D, the CPU 15 may obtain "Lo" as the read A/D value Voc [dec]. From FIG. 4, the CPU 15 acquires "2.0" as the correction coefficient Z. The CPU 15 then determines, from the Ref conversion table in FIG. 3, the AC power supply voltage value Vac for the A/D value Vop of Lo. Here, the CPU 15 acquires 55 Vac as the AC power supply voltage Vac. Although the actual voltage value of the AC power supply 10 is 110 V, a variation in detected voltage Vo occurs due to a change in transmission efficiency of the photocoupler 13. The CPU 15 substitutes 55 Vac for the AC power supply voltage value Vac and substitutes 2.0 for the correction coefficient Z in Equation (3) to obtain 110 VAC as the corrected AC power supply voltage value VAC. Thus, the variation in detected voltage Vo due to the change in transmission efficiency of the photocoupler 13 is corrected.

As another example, in the correction period from time t1 to time t2 in FIGS. 2A to 2D, the CPU 15 may obtain "Hi" as the read A/D value Voc [dec]. From FIG. 4, the CPU 15 acquires "0.65" as the correction coefficient Z. The CPU 15 then determines, from the Ref conversion table in FIG. 3, the AC power supply voltage value Vac for the A/D value Vop of Hi. Here, the CPU 15 acquires 170 Vac as the AC power supply voltage Vac. Although the actual voltage value of the AC power supply 10 is 110 V, a variation in detected voltage Vo occurs due to a change in transmission efficiency of the photocoupler 13. The CPU 15 substitutes 170 Vac for the AC power supply voltage value Vac and substitutes 0.65 for the correction coefficient Z in Equation (3) to obtain 110.5 VAC as the corrected AC power supply voltage value VAC. Thus, the variation in detected voltage Vo due to the change in transmission efficiency of the photocoupler 13 is corrected.

In this manner, with the correction coefficient Z in FIG. 4 and the Ref conversion table in FIG. 3, an appropriate AC power supply voltage value VAC can be determined according to the actual transmission characteristic of the photocoupler 13. In the first embodiment, only the correction coefficient Z is determined in the correction period (t1 to t2), and the corrected AC power supply voltage value VAC is determined when input is received from the AC power supply 10 after time t5.

Returning to the description of FIGS. 2A to 2D, the CPU 15 sets the Ref_ctrl signal to Lo (the Relay_ctrl signal remains Lo) at time t2, and sets the Relay_ctrl signal to Hi (the Ref_ctrl signal remains Lo) at time t3 in FIGS. 2A to 2D. Accordingly, both the relay 17 and the FET 29 are OFF during the period from time t2 to time t3. This period from time t2 to time t3 is a dead-time period provided for preventing the diode 13d from being in an overcurrent state. At time t3, the relay 17 is turned on and the FET 29 is turned off, so that current is supplied from the AC power supply 10 to the photodiode 13d. The detected voltage Vo takes values based on the voltage of the AC power supply 10.

[Calculation of AC Power Supply Voltage Value VAC]

The description above was about correcting a detection variation due to the temperature characteristics and aging of the voltage detection apparatus 100. The following description will be about calculating the AC power supply voltage value VAC after time t3 in FIGS. 2A to 2D. In the first embodiment, the CPU 15 calculates the AC power supply voltage value VAC by detecting the peak value from A/D values read from the detected voltage Vo. This peak value is Vop [dec] in the diagram of A/D value in FIGS. 2A to 2D.

In the configuration in the first embodiment shown in FIG. 1, the higher the voltage of the AC power supply 10, the larger the current flowing to the diode 13d of the photocoupler 13 (see FIG. 2B). Accordingly, the detected voltage Vo observed while the AC power supply 10 is input takes values inversely proportional to the voltage values of the AC power supply 10, as seen in the period from time t4 to time t6 in FIGS. 2A to 2D. The peak value Vop in the first embodiment is therefore the smallest value in the A/D values within a predetermined period (for example, the period from time t4 to time t6).

(Process of Calculating AC Power Supply Voltage Value VAC)

Figure 5:
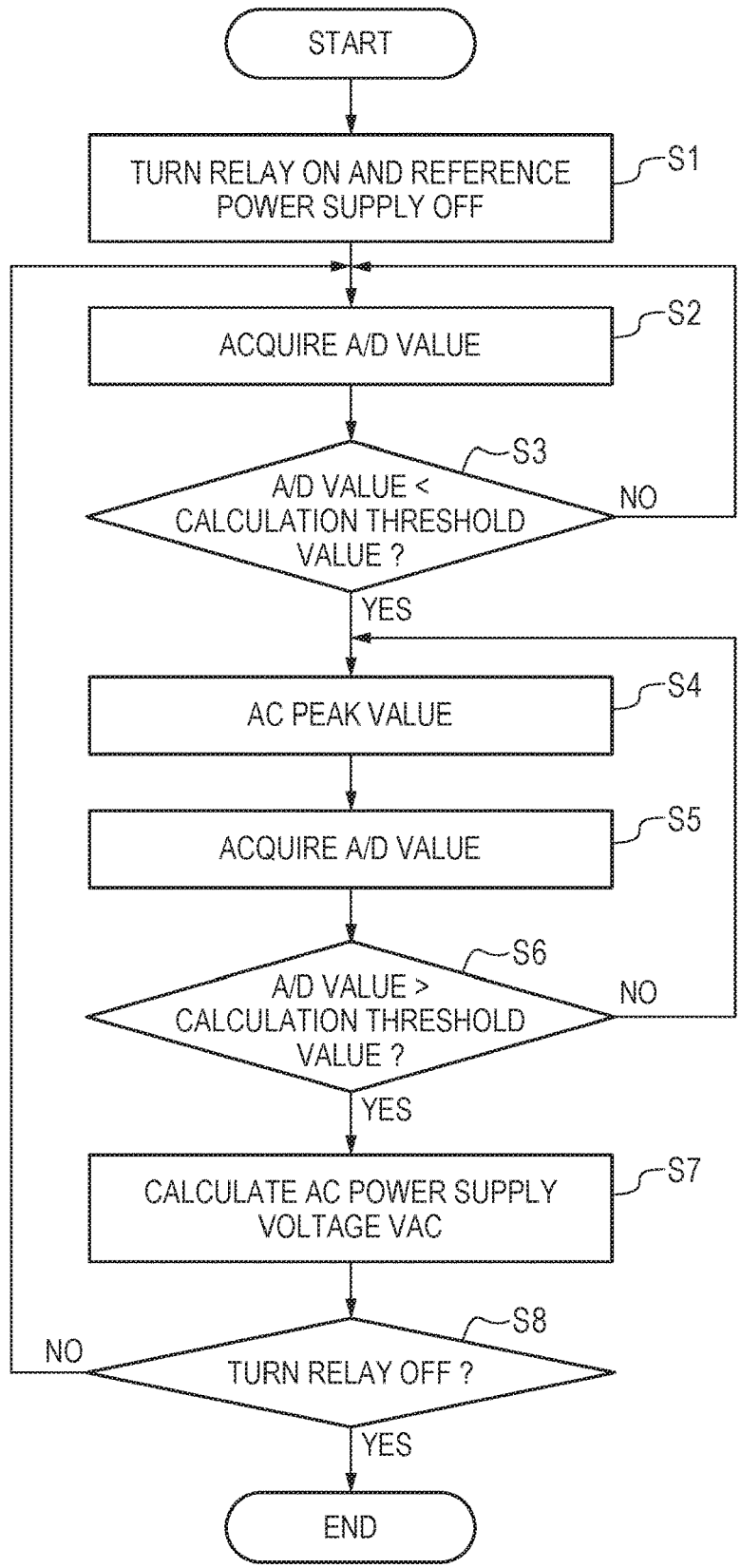
FIG. 5 is a flowchart illustrating the process of calculating an AC power supply voltage in the first embodiment.

FIG. 5 is a flowchart for describing the process in which the CPU 15 calculates the above-described peak value Vop from the A/D values to calculate the AC power supply voltage value VAC. At step (hereinafter denoted as S) 1, the CPU 15 sets the Relay_ctrl signal to Hi to turn on the relay 17 (ON), and sets the Ref_ctrl signal to Lo to cut off input from the reference power supply 110 (OFF) (time t3 in FIGS. 2A to 2D). The CPU 15 now detects the voltage input from the AC power supply 10. The CPU 15 proceeds with the subsequent processing by comparing an A/D value resulting from conversion by the A/D converter 16 and the calculation threshold value illustrated in FIGS. 2A to 2D. Details of the processing will now be described with reference to FIG. 5 and the period from time t4 to time t6 in FIGS. 2A to 2D.

At time t4 in FIGS. 2A to D, the CPU 15 is performing the processing at S2 and S3 in FIG. 5. At S2, the CPU 15 acquires an A/D value read from a detected voltage Vo. At S3, the CPU 15 determines whether the A/D value acquired at S2 is smaller than the calculation threshold value. If the A/D value is determined not to be smaller than the calculation threshold value at S3, the CPU 15 returns the process to S2. If the A/D value is determined to be smaller than the calculation threshold value at S3, the CPU 15 advances the process to S4. For example, because the A/D value and the calculation threshold value at time t4 in FIGS. 2A to 2D has the relationship "A/D value>calculation threshold value," the CPU 15 performs the process at S2 again. The CPU 15 repeats S2 and S3 until "A/D value<calculation threshold value" is reached at time t5.

When "A/D value<calculation threshold value" is reached at time t5, the CPU 15 performs the process at S4 to S6 for calculating the peak value Vop. The CPU 15 acquires the peak value Vop at S4, acquires an A/D value at S5, and determines at S6 whether the A/D value acquired at S5 is larger than the calculation threshold value. If the A/D value is determined not to be larger than the calculation threshold value at S6, the CPU 15 returns the process to S4. If the A/D value is determined to be larger than the calculation threshold value at S6, the CPU 15 advances the process to S7. For example, the CPU 15 acquires the peak value Vop by continuously updating the smallest A/D value among the A/D values (digital values) acquired in the period from time t5 when "A/D value<calculation threshold value" is reached (Y at S3) to time t6 when "A/D value>calculation threshold value" is reached.

For example, "A" will denote the previous A/D value acquired by the CPU 15, and "B" will denote the current A/D value acquired by the CPU 15. The CPU 15 compares "A" and "B," and if, for example, "B" is determined to be smaller, "B" is regarded as the smallest value (i.e., the peak value up to this point) and stored in the memory unit 15m. The CPU 15 then acquires the latest A/D value in the processing at S5 and compares the A/D value acquired at S5 with the calculation threshold value at S6. If the A/D value is still smaller than the calculation threshold value, the process at S4 is performed again. That is, with "C" denoting the A/D value acquired at S5, the CPU 15 compares "B" stored as the smallest value (the peak value up to this point) at S4 with "C" acquired this time. If "B" is determined to be smaller, the CPU 15 continuously holds "B" as the smallest value in the memory unit 15m. If "C" is determined to be smaller, the CPU 15 now stores "C" as the smallest value in the memory unit 15m. In this manner, the CPU 15 acquires the peak value Vop in the predetermined period (for example, the period from time t4 to time t6).

When "A/D value>calculation threshold value" is reached at time t6 in FIGS. 2A to 2D, the CPU 15 calculates the AC power supply voltage value VAC at S7. From the peak value Vop determined at S4, the CPU 15 uses the Ref characteristic (the Ref conversion table) in FIG. 3 to determine the uncorrected AC power supply voltage value Vac. The CPU 15 then calculates the corrected AC power supply voltage value VAC with Equation (3) using the correction coefficient Z, which has been determined with Voc and the information in FIG. 4 in the period from time t1 to time t2. At S8, the CPU 15 determines whether to turn off the relay 17. If the relay 17 is determined not to be turned off, the CPU 15 returns the process to S2. If the relay 17 is determined to be turned off, the CPU 15 terminates the process. Through the above procedure, the AC power supply voltage value VAC can be determined.

The AC power supply voltage value VAC determined at time t6 by the process at S7 is stored until time t8. That is, the next process cycle is started to acquire the peak value Vop again at S4 at time t7 and calculate the AC power supply voltage value VAC again at S7 at time t8. Thus, the AC power supply voltage value VAC calculated by the CPU 15 is stored in the memory unit 15m for one cycle of the AC power supply 10 and thereafter updated every cycle. The process at S2 to S7 is continued until the relay 17 is turned off (S8). When the CPU 15 again sets the Relay_ctrl signal to Lo and the Ref_ctrl signal to Hi to start the correction period, the CPU 15 again acquires the correction coefficient Z described regarding the period from time t1 to time t2.

Although the CPU 15 acquires the peak value Vop to calculate the AC power supply voltage value VAC in the first embodiment, this does not limit the scope of the claims. For example, an arithmetic unit based on an operational amplifier may generate a peak-hold signal as the detected voltage Vo, which may then be acquired by the CPU 15. Alternatively, an effective value may be calculated from the acquired A/D value, and the calculated effective value may be used to calculate the AC power supply voltage value VAC. The other configurations in the first embodiment are also merely exemplary and not intended to limit the technical scope of the present invention only to the above configurations. Specifically, the photocoupler 13 serving as the transmission unit may be other forms of optical transmission element or may be based on an insulating transformer. The reference power supply 110 may be either an AC reference power supply or a DC reference power supply, as long as it functions as a reference power supply. These variations apply to the following embodiments as well.

In conventional techniques, the transfer of current between the primary and secondary sides of a component such as a photocoupler significantly depends on conditions such as the temperature condition and the aging condition. This prevents accurate detection of the voltage of the AC power supply 10. By contrast, according to the first embodiment, a detection variation due to the temperature characteristics and aging of the voltage detection apparatus is corrected. Thus, voltage can be accurately detected without being affected by temperature changes or aging.

[Voltage Detection Apparatus]

Figure 6:
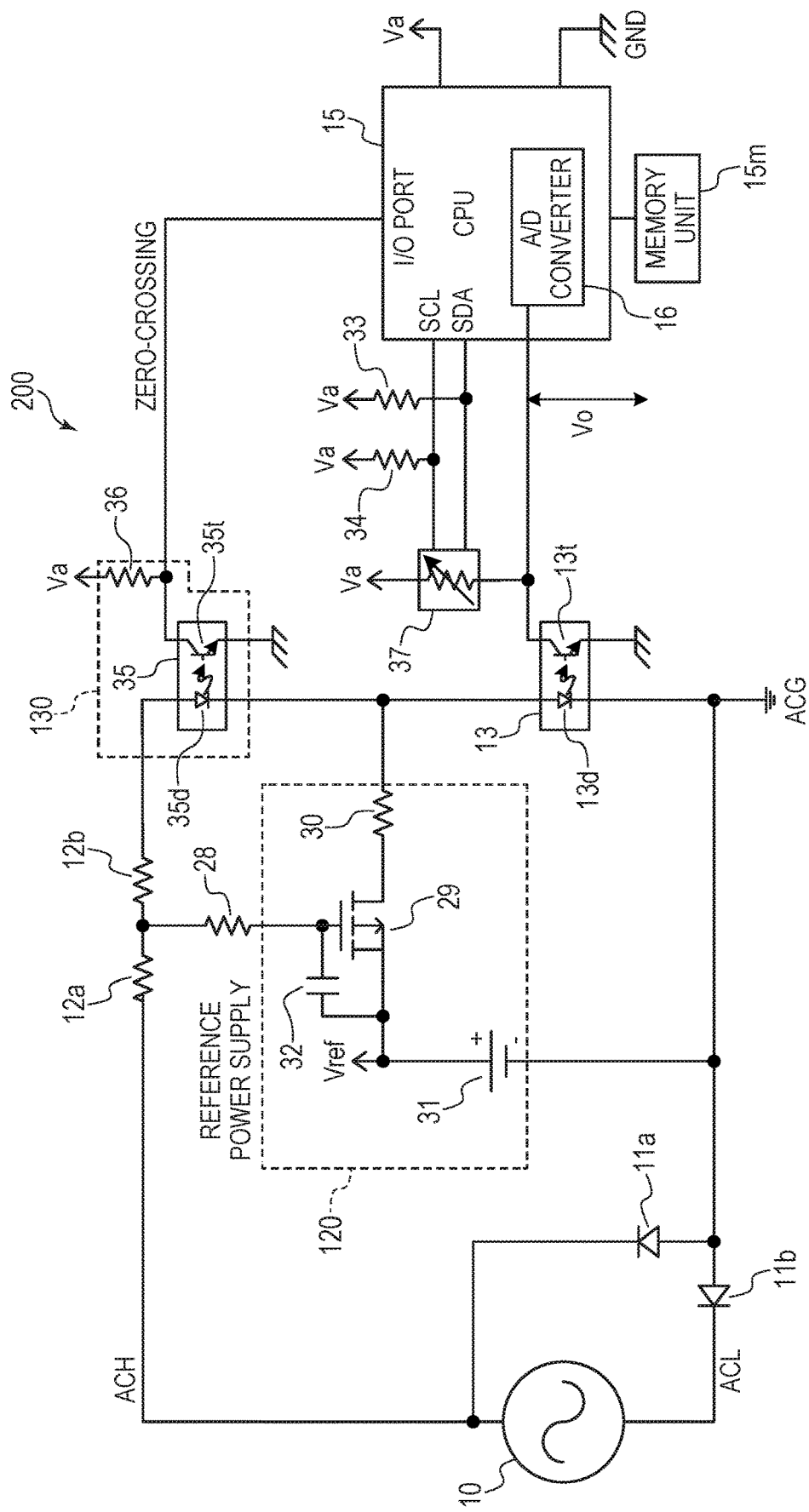
FIG. 6 is a circuit configuration diagram of a voltage detection apparatus in a second embodiment.

Configurations and operations of a voltage detection apparatus 200 in a second embodiment will be described with reference to FIG. 6 and FIGS. 7A to 7F. FIG. 6 illustrates the circuit configuration of the voltage detection apparatus 200 in the second embodiment. In FIG. 6, components labeled with like reference symbols as in the circuit configuration in the first embodiment shown in FIG. 1 have like functions. Compared with FIG. 1 presented in the first embodiment, FIG. 6 lacks the driving circuit for the FET 29 based on the Ref_ctrl signal, the relay 17, and the driving circuit for the relay 17 based on the Relay_ctrl signal. The resistor 12 is separated into two parts 12a and 12b, and their midpoint is connected to the gate terminal of the FET 29 via the resistor 28. Further, a zero-crossing circuit 130 that includes a photocoupler 35 and a resistor 36 is added. In FIG. 6, the resistor 14 in the first embodiment is replaced with a digital potentiometer 37 (hereinafter denoted as a DPM 3) capable of I-squared-C communication with the CPU 15. The DPM 37 is a resistance element with the resistance value adjustable under the control of the CPU 15. The other components are configured as in the first embodiment.

A reference power supply 120 in the second embodiment has a capacitor 32 connected between the gate terminal and the source terminal of the FET 29. The diode 13d on the primary side of the photocoupler 13 in the second embodiment has the anode to which a diode 35d on the primary side of the photocoupler 35 is connected. The transistor 13t on the secondary side of the photocoupler 13 has the collector terminal to which the DPM 37 is connected. The one end of the DPM 37 is connected to the power supply Va via a resistor 33, and the other end is connected to the power supply Va via a resistor 34. The one end of the DPM 37 is also connected to an SDA terminal of the CPU 15, and the other end is also connected to an SCL terminal of the CPU 15. A transistor 35t on the secondary side of the photocoupler 35 has the collector terminal to which the power supply Va is connected via the resistor 36, and the emitter terminal which is grounded. The collector terminal of the transistor 35t is also connected to the CPU 15. The CPU 15 receives input of a zero-crossing signal from the photocoupler 35.

FIGS. 7A to 7F illustrate reference waveforms for chronologically describing operations characteristic to the second embodiment. FIG. 7A illustrates the waveform of the voltage of the AC power supply 10. FIG. 7B illustrates the waveform of the zero-crossing signal input from the zero-crossing circuit 130. FIG. 7C illustrates the waveform of the voltage (the S-G voltage) between the source terminal and gate terminal of the FET 29 in the reference power supply 120. FIG. 7D illustrates the waveform of the current flowing to the diode 13d of the photocoupler 13. The dotted line in FIG. 7C indicates a threshold for turning on the FET 29 (an ON threshold value). The dotted line in FIG. 7D indicates a set current value for the diode 13d. FIG. 7E illustrates the detected voltage Vo. FIG. 7F illustrates the A/D value read from the detected voltage Vo. The dotted lines in FIG. 7E indicate the voltage-converted value of a calculation threshold value, and the voltage-converted value of a correction target value (a target value). The dotted lines in FIG. 7F indicate the calculation threshold value and the correction target value. The abscissa in each diagram indicates time.

[Zero-Crossing Circuit]

Detailed operations will be described below, first for the zero-crossing circuit 130 and then for the reference power supply 120. The zero-crossing circuit 130 is a circuit that outputs a high-level or low-level signal (hereinafter referred to as an H/L signal) in synchronization with the AC power supply 10. When the potential on the ACH side of the AC power supply 10 becomes positive and forward current flows to the diode 35d of the photocoupler 35, the transistor 35t is turned on. Accordingly, current flows from the power supply Va to the resistor 36, and a low-level zero-crossing signal is input to an I/O port of the CPU 15. When the potential on the ACH side of the AC power supply 10 becomes negative, the transistor 35t is turned off to bring about the inverse of the above operations, so that a high-level zero-crossing signal is input.

[Reference Power Supply 120]

Next, the reference power supply 120 will be described. The FET 29 in the reference power supply 120 is turned on and off in synchronization with the AC power supply 10. As indicated by the voltage (the S-G voltage) between the source terminal and the gate terminal of the FET 29 in FIGS. 7A to 7F, because the FET 29 is a p-channel MOSFET, the FET 29 is turned on if the gate voltage falls to or below the ON threshold value with reference to the source voltage. That is, the FET 29 is OFF while the ACH side of the AC power supply 10 is at a positive potential and forward current flows to the diode 35d of the photocoupler 35 and to the diode 13d of the photocoupler 13. While the ACH side of the AC power supply 10 is at a negative potential, the FET 29 is ON and current flows from the reference power supply 120 to the diode 13d of the photocoupler 13 via the resistor 30. Therefore, as illustrated in FIG. 7D, the current from the ACH of the AC power supply 10 and the current from the reference power supply 120 alternately flow to the diode 13d of the photocoupler 13 (for every half cycle of the AC voltage). Accordingly, as illustrated in FIG. 7E, a voltage corresponding to the AC voltage of the AC power supply 10 and a voltage corresponding to the reference power supply 120 alternately occur as the detected voltage Vo on the secondary side.

[Correction Method and Method of Calculating AC Power Supply Voltage Value VAC]

The correction method and the method of calculating the AC power supply voltage value VAC in the second embodiment will now be described. In the second embodiment, the zero-crossing signal is used to switch between the correction period and the period for calculating the AC power supply voltage value VAC. Specifically, the correction period (a first state) is when the zero-crossing signal is at high level, and the period for calculating the AC power supply voltage value VAC (a second state) is when the zero-crossing signal is at low level. In this manner, the second embodiment uses the zero-crossing signal synchronized with the AC power supply 10 to simplify the determination by the CPU 15 of switching between the correction period and the period for calculating the AC power supply voltage value VAC.

When the zero-crossing signal goes from low level to high level at time t11 in FIGS. 7A to 7F, the detected voltage Vo becomes the voltage corresponding to the reference power supply 120. The CPU 15 converts the value of the detected voltage Vo into an A/D value through the A/D converter 16 before the zero-crossing signal goes from high level to low level at time t12. The CPU 15 compares the read A/D value and the correction target value in FIG. 7F and adjusts the resistance value of the DPM 37 according to the comparison result. The correction target value in FIG. 7F is a value such that the correction coefficient in FIG. 4 presented in the first embodiment takes the value 1.0. The correction target value is a reference value for adjusting the detected voltage Vo by adjusting the resistance value of the DPM 37, so that the REF characteristic in FIG. 3 can be used to achieve a highly accurate result in calculating the AC power supply voltage value VAC.

In the first embodiment, the deviation of the actual characteristic from the REF characteristic (the Ref conversion table) in FIG. 3 maintained by the CPU 15 is corrected with the correction coefficient Z acquired from the A/D value (corresponding to Voc) read in the correction period; a highly accurate AC power supply voltage value VAC is thus calculated. By contrast, in the second embodiment, in order to align the actual characteristic with the REF characteristic in FIG. 3, the resistance value of the DPM 37 is adjusted so that the read A/D value matches the correction target value. Again in the second embodiment, settings are made such that Equation (1) holds when the voltage of the AC power supply 10 is 110 V. The correction target value is therefore the A/D value (Vo1 [dec]) for the REF characteristic at 110 V (the predetermined value). In this manner, the voltage can be detected with higher resolution.

As shown in FIGS. 7A to 7F, if the A/D value read in the correction period from time t11 to time t12 and the correction target value have the relationship "A/D value>correction target value," the CPU 15 adjusts the DPM 37 through I-squared-C communication to increase the resistance value of the DPM 37. Specifically, in the second embodiment, the reading in the correction period and the comparison with the correction target value is completed at time t12. After a lapse of a certain period, the resistance value of the DPM 37 is adjusted at time t13. The adjusted resistance value is determined by the ratio of the read A/D value and a set resistance value of the DPM 37 at the time of reading the A/D value to the correction target value and a set resistance value of the corrected DPM 37.

In the next correction period from time t14 to time t15, the CPU 15 acquires an A/D value again and similarly compares the A/D value with the correction target value and adjusts the resistance value of the DPM 37. In FIGS. 7A to 7F, the resistance value of the DPM 37 is readjusted at time t16, so that the read A/D value is substantially equal to the correction target value in the correction period from time t17 to time t18. In this manner, the CPU 15 repeatedly adjusts the resistance value of the DPM 37 until the A/D value becomes equal to the correction target value. In actual operation, making the A/D value exactly equal to the correction target value is extremely difficult and takes time. The time required for the correction may be reduced by allowing for a certain tolerance for the correction target value. That is, adjusting may be reducing the difference between the A/D value and the correction target value, specifically to within a predetermined tolerance.

Once the A/D value read in the correction period becomes substantially equal to the correction target value as seen in the period from time t17 to time t18, the CPU 15 determines that the adjustment of the resistance value of the DPM 37 is completed. The CPU 15 calculates the AC power supply voltage value VAC in the period in which the zero-crossing signal is at low level immediately after the completion of the adjustment of the resistance value of the DPM 37, i.e., the period from time t18 to time t21. If the adjustment of the resistance value of the DPM 37 is not completed (the period from time t11 to time t12, and the period from time t14 to time t15), the AC power supply voltage value VAC is not calculated in the following low-level zero-crossing signal period (the period from time t12 to time t14, and the period from time t15 to time t17). That is, in the second embodiment, the A/D value and the correction target value are compared every cycle of the AC power supply 10. After the deviation from the correction target value is corrected, or in other words, with an optimal correction value, the AC power supply voltage value VAC can be calculated.

The specific way of calculating the AC power supply voltage value VAC in the period from time t18 to time t21 is based on effective-value calculation. The second embodiment may also adopt the calculation based on the peak voltage Vop as illustrated in the first embodiment. In the second embodiment, effective-value calculation is adopted to allow highly accurate calculation of the AC power supply voltage value VAC even if the AC power supply 10 is distorted. In calculating the AC power supply voltage value VAC with effective-value calculation, Equation (4) is used to determine an effective value RMS from the detected voltage Vo.

$$\text{RMS} = \sqrt{\frac{1}{T} \int_0^T f(Va - Vo)^2 dt} \qquad (4)$$

Va: the reference voltage for the detected voltage Vo
T: a half cycle of the AC power supply 10

The half cycle T in Equation (4) is the period from time t18 to time t21 in which the zero-crossing signal is at low level in FIGS. 7A to 7F. When the effective value RMS in Equation (4) is calculated by the CPU 15, the effective value RMS is calculated with Equation (5) from read A/D values.

$$RMS = \sqrt{\frac{(Vot[dec] - Vdec_0)^2 + (Vot[dec] - Vdec_1)^2 + \ldots + (Vot[dec] - Vdec_{n-1})^2 + (Vot[dec] - Vdec_n)^2}{n}} \quad (5)$$

Vot [dec]: the A/D value corresponding to the calculation threshold value
Vdec: A/D values read in a desired sampling period In the second embodiment, 0 to n represents the number of A/D values acquired in the period in which an A/D value is not larger than the calculation threshold value, that is, the number of the A/D values acquired in the period from time t19 to time t20 in FIGS. 7A to 7F. The A/D value sampling period may be as shorter as possible to realize a higher accuracy of detecting the AC power supply voltage value VAC. A sampling frequency in the range of at least 5 kHz to 20 kHz is required, depending on the noise frequency superimposed on the AC power supply 10. The CPU 15 maintains, in the memory unit 15m, an AC power supply voltage REF characteristic table in which Vop [dec] on the abscissa in FIG. 3 is replaced with the effective value RMS. The CPU 15 calculates the AC power supply voltage value VAC based on the REF characteristic. This allows the accurate effective voltage of the AC power supply 10 to be obtained even if a noise such as a high-frequency noise or a low-frequency noise is superimposed on the AC power supply 10.

In the second embodiment, the configurations as above allow the AC power supply voltage value VAC to be detected with further higher resolution. In addition, because the correction value can be revised every cycle of the AC power supply 10, a highly accurate AC power supply voltage can be detected even if the temperature condition of the voltage detection apparatus 200 changes every moment.

Thus, according to the second embodiment, voltage can be accurately detected without being affected by temperature changes or aging.

[Voltage Detection Apparatus]

Figure 8:
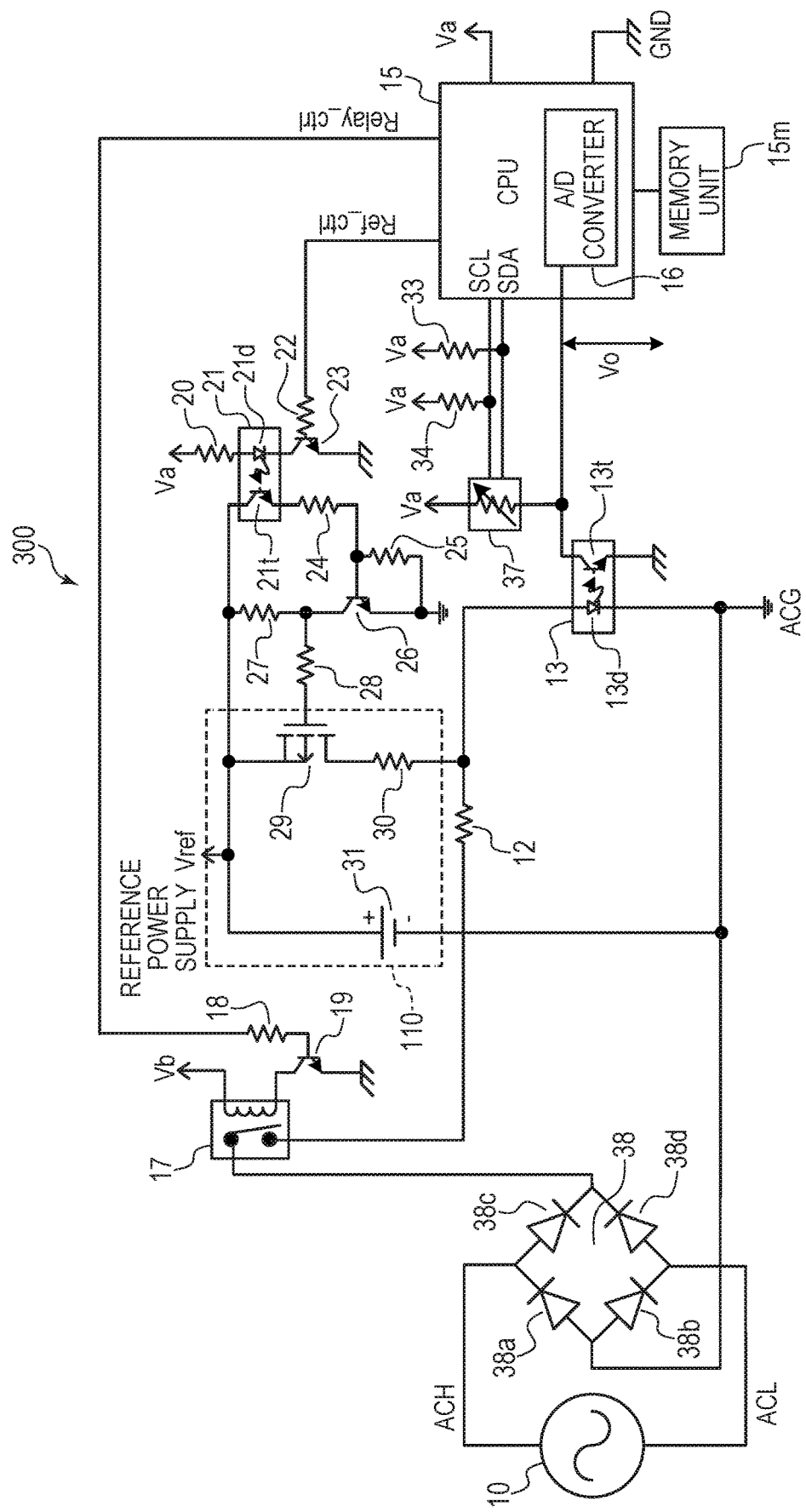
FIG. 8 is a circuit configuration diagram of a voltage detection apparatus in a third embodiment.

Configurations and operations of a voltage detection apparatus in a third embodiment will be described with reference to FIG. 8 and FIGS. 9A to 9D. FIG. 8 illustrates the circuit configuration of the voltage detection apparatus 300 in the third embodiment. In FIG. 8, components labeled with like reference symbols as in the voltage detection apparatus 100 in the first embodiment illustrated in FIG. 1 and the voltage detection apparatus 200 in the second embodiment illustrated in FIG. 6 have like functions. In FIG. 1 presented in the first embodiment, the diodes 11a and 11b disposed downstream of the AC power supply 10 rectify negative voltage. In FIG. 8, this rectification is replaced with full-wave rectification by a bridge diode 38, which is a rectification unit, having diodes 38a, 38b, 38c, and 38d. As in the second embodiment illustrated in FIG. 6, the DPM 37 is provided on the secondary side of the photocoupler 13. The other components are configured as in the first embodiment and therefore will not be described.

[Operations in Voltage Detection Apparatus]

Figure 9:
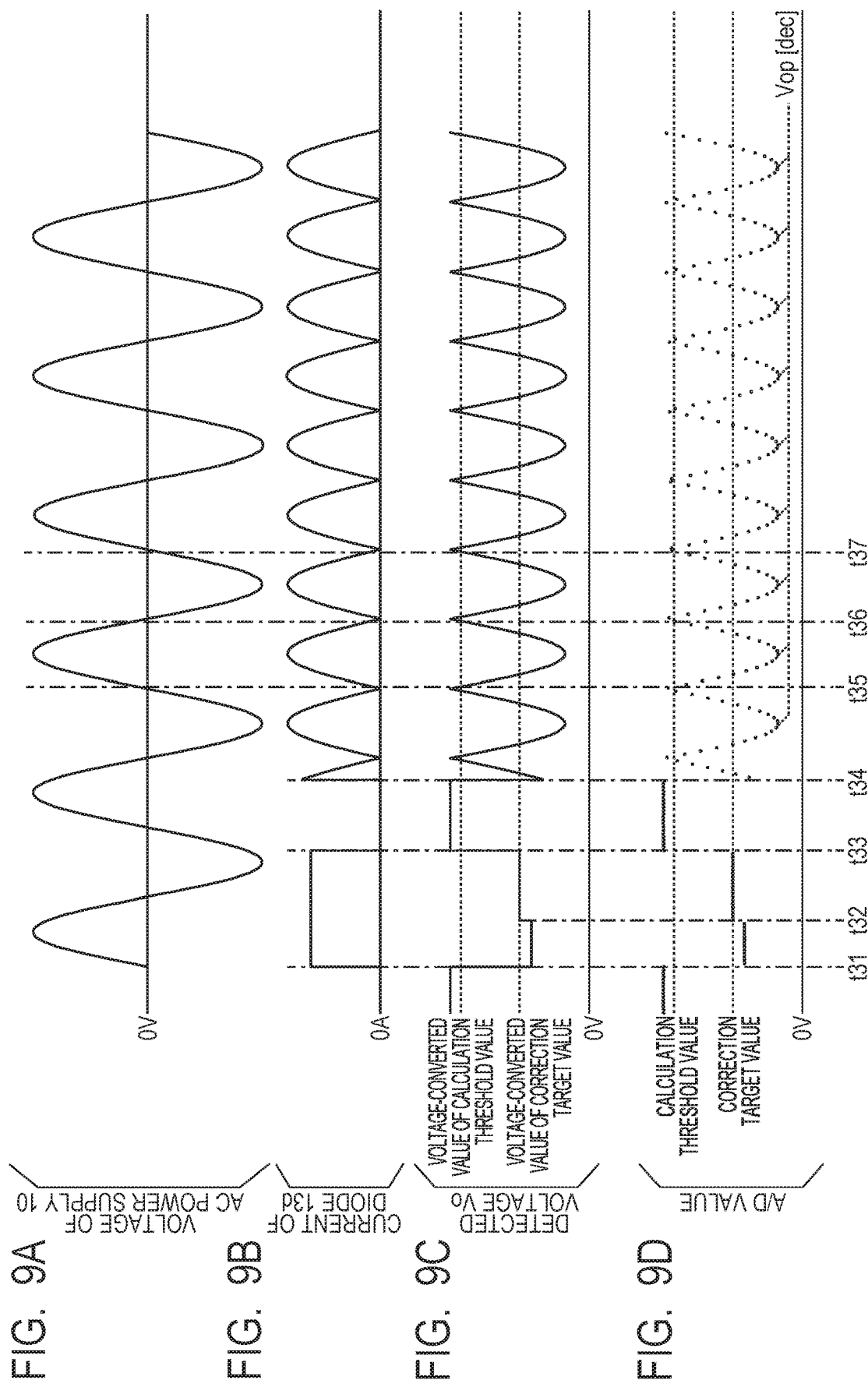
FIGS. 9A, 9B, 9C and 9D are diagrams for describing operations of the voltage detection apparatus in the third embodiment.

Detailed operations will be described below with reference to FIGS. 9A to 9D. FIGS. 9A to 9D illustrate reference waveforms for chronologically describing operations characteristic to the third embodiment. FIG. 9A illustrates the waveform of the voltage of the AC power supply 10. FIG. 9B illustrates the waveform of the current flowing to the diode 13d of the photocoupler 13. FIG. 9C illustrates the waveform of the detected voltage Vo, and the dotted lines indicate the voltage-converted value of a calculation threshold value, and the voltage-converted value of a correction target value. FIG. 9D illustrates the A/D value read from the detected voltage Vo, and the dotted lines indicate the calculation threshold value and the correction target value. The abscissa in each diagram indicates time. The calculation threshold value, the correction target value, and the peak value Vop [dec] shown in FIGS. 9A to 9D are the same as in FIGS. 2A to 2D and FIGS. 7A to 7F and therefore will not be described.

The correction period in the third embodiment is from time t31 to time t33 in FIGS. 9A to 9D. The CPU 15 sets the Relay_ctrl signal to Lo and the Ref_ctrl signal to Hi, as in the first embodiment. This causes only the current from the reference power supply 110 to flow to the diode 13d of the photocoupler 13. As in the second embodiment, the correction method includes the CPU 15 comparing the read A/D value and the correction target value illustrated in FIGS. 9A to 9D and adjusting the resistance value of the DPM 37 according to the comparison result. In FIGS. 9A to 9D, the CPU 15 compares the A/D value read in the period from time t31 to time t32 with the correction target value, and adjusts the resistance value of the DPM 37 at time t32.

As in the first embodiment illustrated in FIG. 5, calculating the AC power supply voltage value VAC includes determining the peak voltage Vop in the period in which a converted A/D value is smaller than the calculation threshold value. However, since the resistance value of the DPM 37 is adjusted, the correction coefficient Z determined in the first embodiment is not needed in the third embodiment. The CPU 15 therefore calculates the AC power supply voltage value VAC based on the calculated peak voltage Vop and the REF characteristic (the Ref conversion table) in FIG. 3. What is significantly different in the third embodiment from the other embodiments is that the detected voltage Vo has a full-wave waveform (see FIG. 9C). The calculation of the AC power supply voltage value VAC after time t34 illustrated in FIGS. 9A to 9D is performed for a full-wave waveform.

The CPU 15 calculates the AC power supply voltage value VAC in the period from time t35 to time t36, and the result is held until updated at time t37. That is, whereas the calculated AC power supply voltage value VAC is updated every cycle of the AC power supply 10 in the first and second embodiments, it is updated every half cycle of the AC power supply 10 in the third embodiment. Therefore, in the third embodiment, an accurate effective value of the AC power supply 10 can be obtained even if a noise such as a high-frequency noise or a low-frequency noise is superimposed on only either one of the positive half wave and the negative half wave of the AC power supply 10.

In the third embodiment, the configurations as above allow the AC power supply voltage value VAC to be calculated for the full-wave waveform of the AC power supply 10. An accurate effective voltage of the AC power supply can be detected even if a noise such as a high-frequency noise or a low-frequency noise is superimposed on only either one of the positive half wave and the negative half wave of the AC power supply 10.

Thus, according to the third embodiment, voltage can be accurately detected without being affected by temperature changes or aging.

[Voltage Detection Apparatus]

Figure 10:
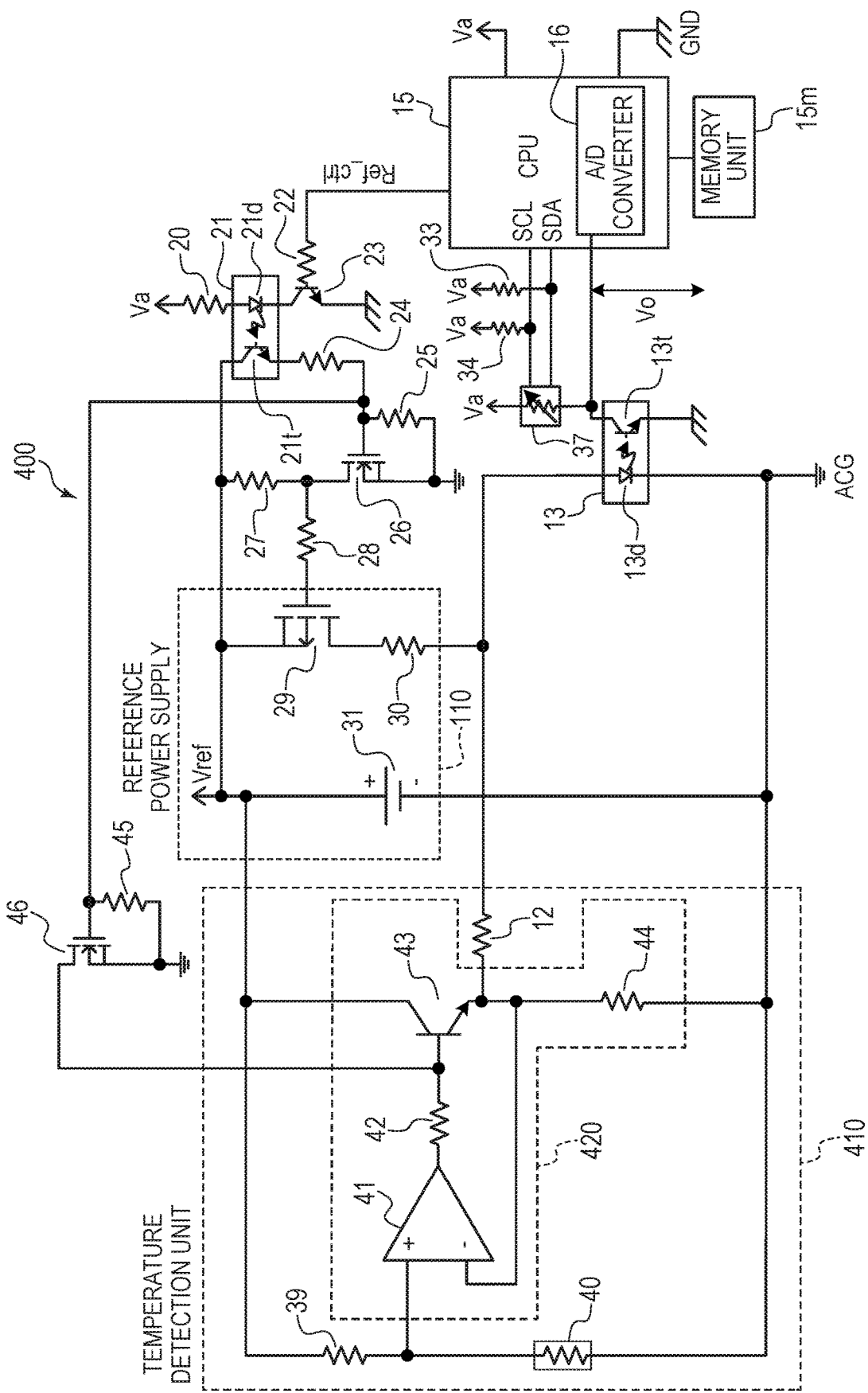
FIG. 10 is a circuit configuration diagram of a voltage detection apparatus in a fourth embodiment.

Configurations and operations of a voltage detection apparatus in a fourth embodiment will be described with reference to FIG. 10, FIGS. 11A to 11D, and FIG. 12. FIG. 10 illustrates the circuit configuration of the voltage detection apparatus 400 in the fourth embodiment. In FIG. 10, components labeled with like reference symbols as in the circuit configurations in the first, second and third embodiments illustrated in FIGS. 1, 6 and 8, respectively have like functions.

The voltage detection apparatuses in the first to third embodiments detect voltage for calculating the voltage value (VAC) of the AC power supply 10. The voltage detection apparatus in the fourth embodiment aims to detect temperature. Hereinafter, the voltage detection apparatus 400 will be referred to as a temperature detection apparatus 400. The temperature detection apparatus 400 is used to detect the temperature of a heat generation member disposed on the primary side of an apparatus, for example an image forming apparatus. That is, the detection target in the fourth embodiment is the temperature of the heat generation member. In the first embodiment, the AC power supply 10 is connected as the source of the primary information that the secondary side wants to detect, and the diodes 11a and 11b are provided as circuit parts for converting the primary information into voltage. By contrast, in the fourth embodiment, a temperature detection unit 410 for detecting temperature information is provided on the primary side.

[Temperature Detection Unit]

The temperature detection unit 410 is configured to supply, to the photocoupler 13 via a buffer circuit 420, a voltage resulting from dividing the reference voltage 31 by a resistor 39 and a thermistor 40, which is a temperature detection element. The temperature detection unit 410 serves as a voltage conversion unit that converts information about the temperature detected by the thermistor 40 into voltage. The buffer circuit 420 is a buffer circuit for current amplification and includes an operational amplifier 41, a resistor 42, a transistor 43, and a resistor 44. The value of the voltage divided by the resistor 39 and the thermistor 40 is input to the non-inverting input terminal (the positive (+) terminal) of the operational amplifier 41. The output terminal of the operational amplifier 41 is connected to the base terminal of the transistor 43 via the resistor 42. The transistor 43 has the collector terminal to which the positive (+) side of the reference voltage 31 is connected, and the emitter terminal to which one end of the resistor 44 is connected. The other end of the resistor 44 is connected to the negative (−) terminal of the reference voltage 31. The junction of the emitter terminal of the transistor 43 and the one end of the resistor 44 is input to the inverting input terminal (the negative (−) terminal) of the operational amplifier 41. The junction of the emitter terminal of the transistor 43 and the one end of the resistor 44 is also connected to the anode of the diode 13d of the photocoupler 13 via the resistor 12.

The value of the reference voltage 31 divided by the resistor 39 and the thermistor 40 varies with temperature because the thermistor 40 is disposed near the heat generation member. If the offset voltage of the operational amplifier 41 is ignored, the voltage generated across the resistor 44 as an output of the buffer circuit 420 is equal to the voltage generated across the thermistor 40. This buffer circuit 420 is provided for allowing sufficient current to flow to the diode 13d of the photocoupler 13.

In the first embodiment, the input information for the photocoupler 13 is switched with the Relay_ctrl signal and the Ref_ctrl signal. By contrast, in the third embodiment, an FET 46 is provided so that the input information can be switched with only the Ref_ctrl signal. The FET 46 has the drain terminal to which the output terminal of the operational amplifier 41 is connected via the resistor 42, and the gate terminal to which the emitter terminal of the transistor 21t of the photocoupler 21 is connected via the resistor 24.

The source terminal of the FET 46 is grounded. A resistor 45 is connected between the gate terminal and the source terminal of the FET 46. If the Ref_ctrl signal is set to Hi, the photocoupler 21 is turned on and the gate voltage of the FET 46 increases. This causes the transistor 43 to be turned off (open), so that the output from the temperature detection unit 410 is stopped. The FET 46 is turned on, and the FET 26 and the FET 29 are also turned on. Current is then supplied from the reference power supply 110 to the diode 13d of the photocoupler 13. In this manner, the input information for the photocoupler 13 is switched. If the Ref_ctrl signal is set to Lo, the FET 29 is turned off and the current to be supplied from the reference power supply 110 to the diode 13d of the photocoupler 13 is cut off. The FET 46 is also turned off, and current is supplied from the temperature detection unit 410 to the photocoupler 13 via the resistor 12.

When the FET 46 is ON (a first connection state), the FET 46 cuts off the voltage converted by the temperature detection unit 410 to be supplied to the photocoupler 13, and supplies the voltage of the reference power supply 110 to the photocoupler 13. When the FET 46 is OFF (a second connection state), the FET 46 supplies the voltage converted by the temperature detection unit 410 to the photocoupler 13, and cuts off the voltage of the reference power supply 110 to be supplied to the photocoupler 13. The other circuit operations are the same as in the first embodiment and therefore will not be described.

[Operations in Temperature Detection Apparatus]

Figure 11:
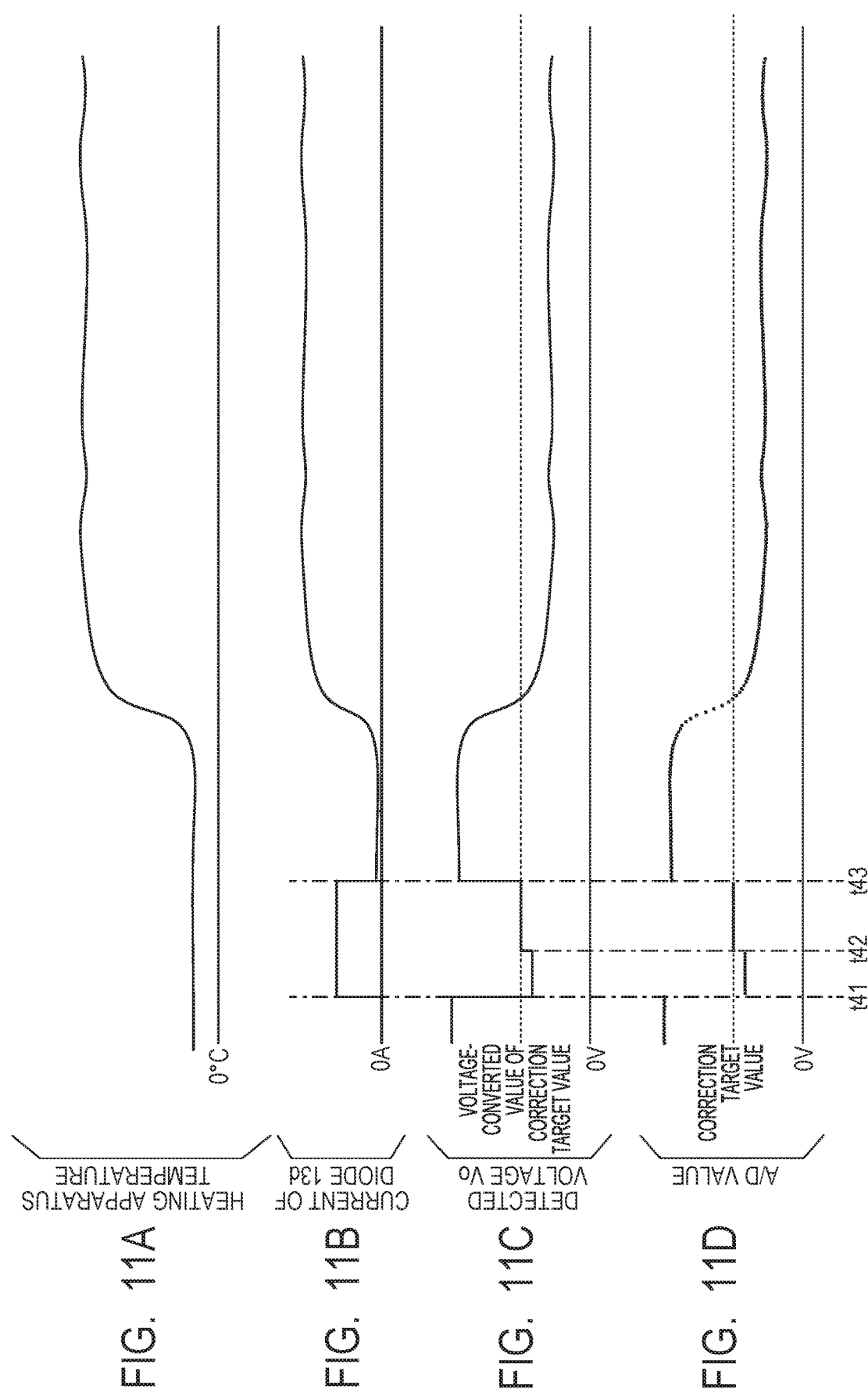
FIGS. 11A, 11B, 11C and 11D are diagrams for describing operations of the voltage detection apparatus in the fourth embodiment.

FIGS. 11A to 11D illustrate reference waveforms for chronologically describing operations characteristic to the fourth embodiment. FIG. 11A illustrates the temperature of a heating apparatus (not shown). FIG. 11B illustrates the waveform of the current flowing to the diode 13d of the photocoupler 13. FIG. 11C illustrates the detected voltage Vo, and the dotted line indicates the voltage-converted value of a correction target value. FIG. 11D illustrates the A/D value read from the detected voltage Vo, and the dotted line indicates the correction target value. The abscissa in each diagram indicates time. The correction target value illustrated in FIGS. 11A to 11D is the same as in FIGS. 7A to 7F and FIGS. 9A to 9D and therefore will not be described.

The period from time t41 to time t43 illustrated in FIGS. 11A to 11D is the same as the correction period described in the third embodiment (from time t31 to time t33). That is, the Ref_ctrl signal is set to Hi to cause current to flow from the reference power supply 110 to the diode 13d of the photocoupler 13. The resistance value of the DPM 37 is then adjusted so that the A/D value becomes equal to the correction target value.

(Relationship between Detected Temperature and A/D Value)

Figure 12:
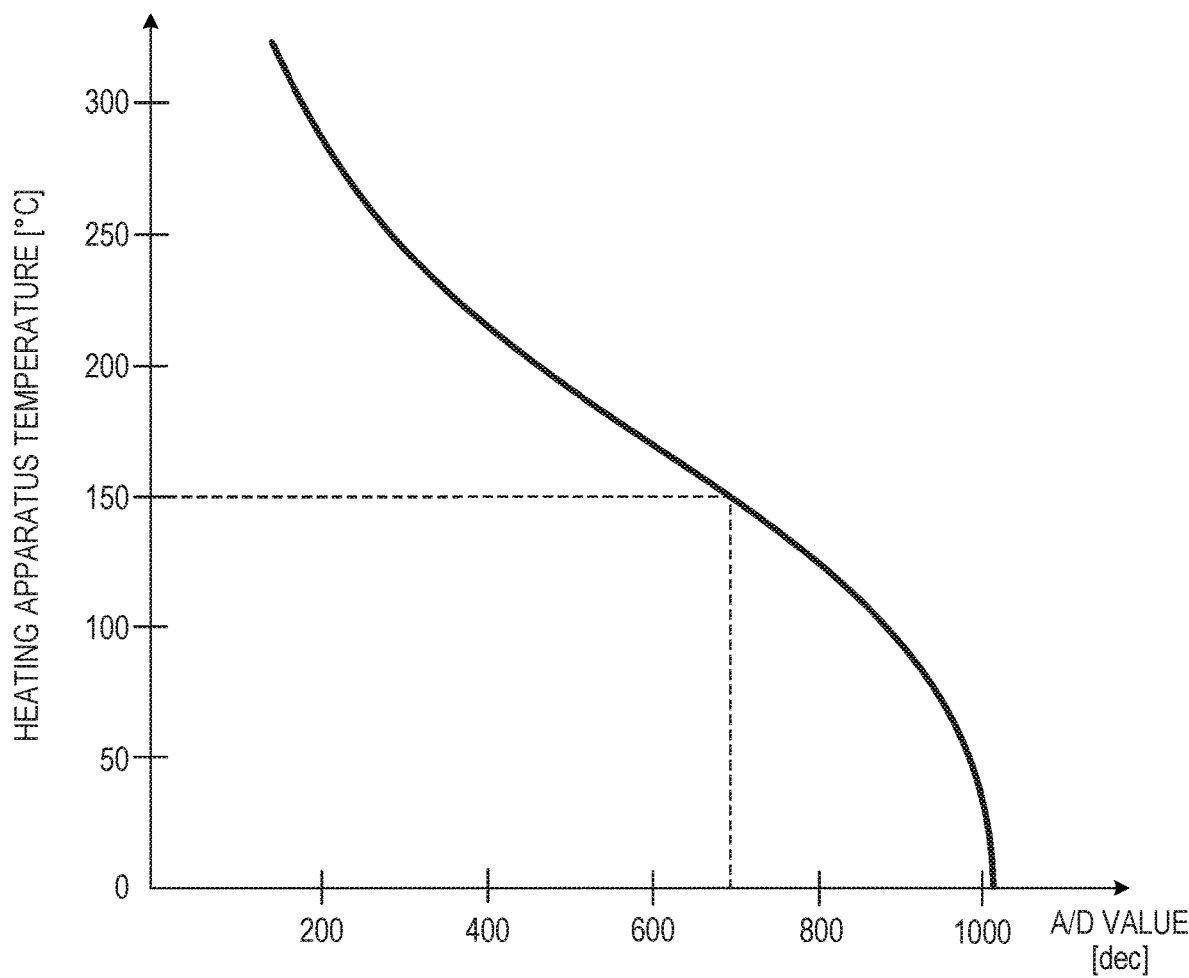
FIG. 12 is a graph illustrating the characteristics of calculated values in the fourth embodiment.

FIG. 12 illustrates the relationship, stored by the CPU 15 in the memory unit 15m, between the temperature of the heating apparatus and the A/D value read by the temperature detection apparatus 400. In FIG. 12, the abscissa indicates the A/D value [dec] and the ordinate indicates the temperature [° C.] of the heating apparatus. In the fourth embodiment, settings are made such that the A/D value read in the correction period from time t41 to time t43 is equal to the A/D value (A/D [dec]) observed when the temperature of the heating apparatus is 150° C. as illustrated in FIG. 12.

Iref will denote the current flowing from the reference power supply 110 to the diode 13d while the Ref_ctrl signal is Hi. Itemp will denote the peak current flowing from the temperature detection unit 410 to the diode 13d while the Ref_ctrl signal is Lo. Then, settings are made such that the current Iref is equal to the peak current Itemp observed when the temperature of the heating apparatus is 150° C. This is based on the idea similar to that of Equation (1) described in the first embodiment, and intended to achieve the effect of transmission rate correction in the fourth embodiment.

The current Iref and the peak current Itemp can be adjusted by having the relationship in Equation (6), ignoring the input offset voltage of the operational amplifier 41 and the ON-resistance of the FET 29. In Equation (6), V31 denotes the reference voltage 31, R30 denotes the resistor 30, R12 denotes the resistor 12, R39 denotes the resistor 39, and TH40 denotes the resistance of the thermistor 40.

$$Itemp = \frac{V31 \times TH40}{R12(R39 + TH40)} = Iref = \frac{V31}{R30} \qquad (6)$$

In this manner, allowing Equation (6) to hold for the resistance value of the thermistor 40 for a predetermined specific temperature can correct a detection variation due to the temperature characteristics and aging of the temperature detection apparatus 400. As in the second embodiment, the deviation of the A/D value in the correction period is adjusted to be within a certain tolerance. In FIGS. 11A to 11D, the CPU 15 reads an A/D value after the correction period starts at time t41. The CPU 15 then adjusts the deviation of the A/D value from the correction target value by adjusting the resistance value of the DPM 37 at time t42. The CPU 15 checks that the A/D value is equal to the correction target value in the period from t42 to t43.

When the correction period ends, the CPU 15 sets the Ref_ctrl signal to Lo and calculates a certain value from an acquired A/D value using the table stored in the memory unit 15m, as in the first embodiment. In the fourth embodiment, the characteristic in FIG. 12 is used to calculate the temperature of the heating apparatus (not shown). In the case of the fourth embodiment, the primary information that the secondary side wants to detect is the temperature of the heating apparatus (not shown), and the A/D value depends on the temperature. That is, unlike in the above first to third embodiments, no calculation for determining the peak value or the effective value from the A/D value is necessary. Rather, the A/D value itself, which is the input information for the CPU 15, corresponds to the abscissa of the graph in FIG. 12 (A/D value [dec]). The CPU 15 thus calculates the temperature information from the read A/D value and controls the temperature of the heat generation member of the heating apparatus (not shown).

In conventional techniques, the transfer of current between the primary and the secondary sides of a component such as a photocoupler significantly depends on conditions such as the temperature condition and the aging condition. This prevents highly accurate detection of the voltage of the input AC power supply 10. As described above, the correction mechanism as in the fourth embodiment may be provided in a temperature detection apparatus in which the primary-side temperature information is detected by the secondary side. This allows correcting a detection variation due to the temperature characteristics and aging of the voltage detection circuit, thereby detecting the temperature information with higher accuracy than in conventional techniques.

Thus, according to the fourth embodiment, voltage can be accurately detected without being affected by temperature changes or aging.

[Description of Laser Beam Printer]

Figure 13:
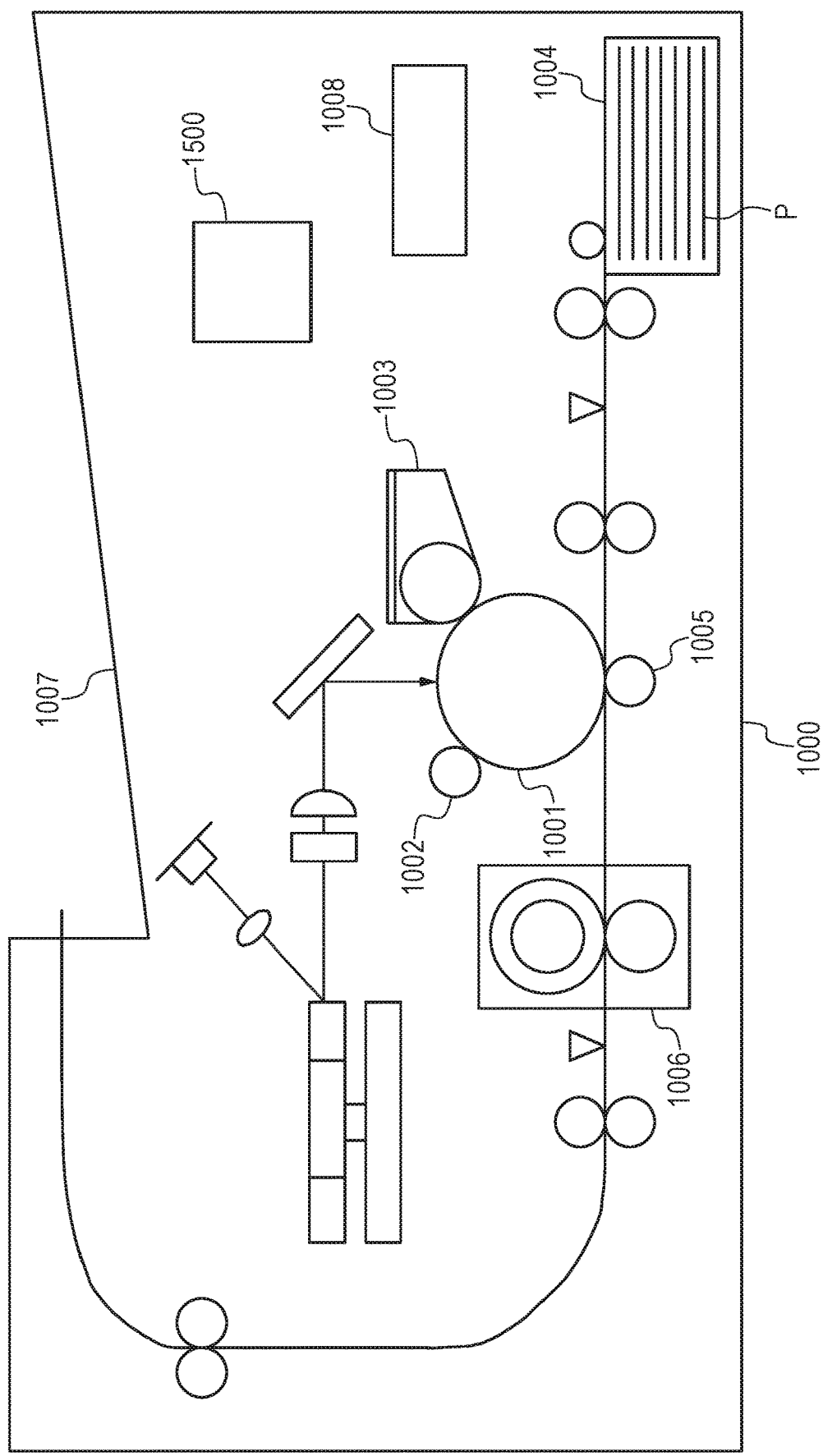
FIG. 13 is a diagram illustrating the configuration of an image forming apparatus in a fifth embodiment.

As an example of image forming apparatuses having the above-described voltage detection apparatuses 100 to 400, FIG. 13 illustrates a schematic configuration of a laser beam printer. The laser beam printer 1000 (hereinafter referred to as a printer 1000) includes a photoconductive drum 1001, a charge unit 1002, and a development unit 1003. The photoconductive drum 1001 is an image carrier on which an electrostatic latent image is formed. The charge unit 1002 uniformly charges the photoconductive drum 1001. The development unit 1003 applies toner to the electrostatic latent image formed on the photoconductive drum 1001 and develops the electrostatic latent image to form a toner image. The toner image formed on the photoconductive drum 1001 (the image carrier) is transferred by a transfer unit 1005 onto a sheet P, which is a recording material, supplied from a cassette 1004. The unfixed toner image transferred on the sheet P is fixed by a fixing device 1006, which is a fixing unit, and the sheet P is ejected onto a tray 1107. The photoconductive drum 1001, the charge unit 1002, the development unit 1003, and the transfer unit 1005 constitute an image forming unit (an image forming unit) that forms an unfixed toner image. The printer 1000 also includes a power supply apparatus 1008, which supplies power to driving units such as motors and to a control unit 1500. The control unit 1500 has a CPU (not shown) and controls operations, such as image forming operations performed by the image forming unit and operations for conveying the sheet P. The control unit 1500 may have the CPU 15.

A certain time after finishing print operations, the printer 1000 transitions to a standby state to be ready for print operations. Further, after a certain time, for reducing power consumption during standby, the printer 1000 transitions from the standby state to a sleep state, which is power-saving mode. The printer 1000 has three states, namely the sleep state, standby state, and print state, and the control unit 1500 causes the printer 1000 to transition among these states. It is to be noted that image forming apparatuses to which the voltage detection apparatuses of the present invention are applicable are not limited to those configured as illustrated in FIG. 13.

The CPU of the printer 1000 may be the CPU 15 in the first embodiment (or the second to fourth embodiments). The printer 1000 having the voltage detection apparatus 100 (or 200 or 300) in the first embodiment (or the second or third embodiment) causes the voltage detection apparatus 100 (or 200 or 300) to detect the input voltage value of the AC power supply 10. For example, based on the corrected AC power supply voltage value VAC detected by the voltage detection apparatus 100 (or 200 or 300) and on the target temperature for fixation process, the CPU 15 determines the power to be supplied to a heat generation member (not shown) of the fixing device 1006. The printer 1000 having the voltage detection apparatus (or the temperature detection apparatus) 400 in the fourth embodiment causes the voltage detection apparatus 400 to detect the temperature of the heat generation member (not shown) of the fixing device 1006. That is, the fixing device 1006 corresponds to the heating apparatus in the fourth embodiment.

Thus, according to the fifth embodiment, voltage can be accurately detected without being affected by temperature changes or aging.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004385, filed Jan. 15, 2019, which is hereby incorporated by reference herein in its entirety.

What is claimed is:

1. A voltage detection apparatus comprising:
a transmission unit whose primary and secondary sides are insulated from each other, the transmission unit configured to transmit primary-side information to the secondary side, and output a voltage value corresponding to the primary-side information at the secondary side;
a reference power supply configured to output a predetermined voltage;
a voltage conversion unit configured to convert target information into a converted voltage;
a switching unit configured to switch between a first state in which the predetermined voltage is supplied from the reference power supply to the primary side of the transmission unit, and a second state in which the converted voltage is supplied from the voltage conversion unit to the primary side of the transmission unit; and
a control unit provided on the secondary side of the transmission unit, and configured to control the switching unit to switch a state of the switching unit to the first state to acquire a correction value from the transmission unit, and control the switching unit to switch the state of the switching unit to the second state to acquire a detection voltage value from the transmission unit, and correct the detection voltage value with the correction value to acquire the target information.

2. The voltage detection apparatus according to claim 1, further comprising an analog-to-digital conversion unit provided on the secondary side of the transmission unit, the analog-to-digital conversion unit configured to convert an analog value of the voltage value output from the transmission unit into a digital value,
wherein the control unit acquires is configured to correct the digital value with the correction value to acquire the target information.

3. The voltage detection apparatus according to claim 1, wherein the switching unit comprises a first connection unit configured to be in a connection state when an AC voltage is supplied to the transmission unit and to be in a non-connection state when the AC voltage to be supplied to the transmission unit is cut off; and a second connection unit configured to be in a connection state when a predetermined voltage of the reference power supply is supplied to the transmission unit and to be in a non-connection state when the predetermined voltage to be supplied to the transmission unit is cut off, and
wherein the control unit realizes the first state by setting the first connection unit in the non-connection state and setting the second connection unit in the connection state, and realizes the second state by setting the first connection unit in the connection state and setting the second connection unit in the non-connection state.

4. The voltage detection apparatus according to claim 3, wherein in the first state, the control unit determines, based on the digital value corresponding to the predetermined voltage, the correction value for correcting the digital value corresponding to the converted voltage converted by the voltage conversion unit, and in the second state, the control unit corrects, with the correction value, a voltage acquired based on the digital value corresponding to the converted voltage converted by the voltage conversion unit.

5. The voltage detection apparatus according to claim 4, wherein, in the second state, the control unit acquires a plurality of digital values output from the analog-to-digital conversion unit, and uses a peak value among the plurality of digital values to acquire the value of the AC voltage.

6. The voltage detection apparatus according to claim 5, wherein the reference power supply and the voltage conversion unit are set such that the digital value output from the analog-to-digital conversion unit in the first state is substantially equal to the digital value output from the analog-to-digital conversion unit when the value of the AC voltage is a predetermined value.

7. The voltage detection apparatus according to claim 6, further comprising a rectification unit configured to subject the AC voltage to half-wave rectification,
wherein the AC voltage subjected to the half-wave rectification by the rectification unit is input into the voltage conversion unit.

8. The voltage detection apparatus according to claim 5, further comprising a rectification unit configured to subject the AC voltage to full-wave rectification,
wherein the AC voltage subjected to the full-wave rectification by the rectification unit is input into the voltage conversion unit.

9. The voltage detection apparatus according to claim 8, further comprising a resistance element connected to the secondary side of the transmission unit and having a resistance value that is adjustable,
wherein the control unit adjusts the resistance value of the resistance element in the second state so that the correction value is reduced, the correction value being a difference between the digital value output by the analog-to-digital conversion unit in the first state and a target value.

10. The voltage detection apparatus according to claim 9, wherein the target value is set such that the digital value output from the analog-to-digital conversion unit in the first state is equal to the digital value output from the analog-to-digital conversion unit when the value of the AC voltage is a predetermined value.

11. The voltage detection apparatus according to claim 2,
wherein the target information is a value of an AC voltage of an AC power supply,
wherein the voltage detection apparatus further comprises:
a zero-crossing circuit configured to output a high-level or low-level zero-crossing signal; and
a resistance element connected to the secondary side of the transmission unit and having a resistance value that is adjustable, and
wherein the switching unit is the zero-crossing circuit in which the state of the switching unit is switched to the first state when the zero-crossing signal is at high level and to the second state when the zero-crossing signal is at low level.

12. The voltage detection apparatus according to claim 11, wherein the control unit adjusts the resistance value of the resistance element in the second state so that the correction value is reduced, the correction value being a difference between the digital value output from the analog-to-digital conversion unit in the first state and a target value.

13. The voltage detection apparatus according to claim 12, wherein after the difference between the digital value output from the analog-to-digital conversion unit in the first state and the target value is reduced to within a predetermined range by adjusting the resistance value of the resistance element, the control unit acquires the value of the AC voltage by determining an effective value of the AC voltage based on the digital value acquired in the second state.

14. The voltage detection apparatus according to claim 13, wherein the target value is set such that the digital value output from the analog-to-digital conversion unit in the first state is substantially equal to the digital value output from the analog-to-digital conversion unit when the value of the AC voltage is a predetermined value.

15. The voltage detection apparatus according to claim 2, wherein the target information is a temperature of a heat generation member,
wherein the switching unit switches to a first connection state in which the converted voltage converted by the voltage conversion unit to be supplied to the transmission unit is cut off and the predetermined voltage of the reference power supply is supplied to the transmission unit, or to a second connection state in which the converted voltage converted by the voltage conversion unit is supplied to the transmission unit and the predetermined voltage of the reference power supply to be supplied to the transmission unit is cut off, and
wherein the control unit realizes the first state by setting the switching unit in the first connection state and realizes the second state by setting the switching unit in the second connection state.

16. The voltage detection apparatus according to claim 15, further comprising a resistance element connected to the secondary side of the transmission unit and having a resistance value that is adjustable,
wherein the control unit adjusts the resistance value of the resistance element so that the correction value is reduced, the correction value being a difference between the digital value output by the analog-to-digital conversion unit in the first state and a target value.

17. The voltage detection apparatus according to claim 16,
wherein the voltage conversion unit comprises a thermistor, and
wherein the target value is set such that the digital value output from the analog-to-digital conversion unit in the first state is substantially equal to the digital value output from the analog-to-digital conversion unit when the resistance value of the thermistor is a resistance value in a predetermined temperature.

18. The voltage detection apparatus according to claim 1, wherein the transmission unit is a photocoupler.

19. The voltage detection apparatus according to claim 1, wherein the transmission unit is a transformer.

20. An image forming apparatus comprising:
an image forming unit configured to form an image;
a fixing unit configured to fix the image formed by the image forming unit onto a recording material; and
a voltage detection apparatus,
the voltage detection apparatus comprising:
a transmission unit whose primary and secondary sides are insulated from each other, the transmission unit configured to transmit primary-side information to the secondary side, and output a voltage value corresponding to the primary-side information at the secondary side;
a reference power supply configured to output a predetermined voltage;
a voltage conversion unit configured to convert target information into a converted voltage;
a switching unit configured to switch between a first state in which the predetermined voltage is supplied from the reference power supply to the primary side of the transmission unit, and a second state in which the converted voltage is supplied from the voltage conversion unit to the primary side of the transmission unit; and
a control unit provided on the secondary side of the transmission unit, and configured to control the switching unit to switch a state of the switching unit to the first state to acquire a correction value from the transmission unit, and control the switching unit to switch the state of the switching unit to the second state to acquire a detection voltage value from the transmission unit, and correct the detection voltage value with the correction value to acquire the target information.

21. The image forming apparatus according to claim 20, the voltage detection apparatus further comprising an analog-to-digital conversion unit provided on the secondary side, the analog-to-digital conversion unit configured to convert an analog value of the voltage value output from the transmission unit into a digital value,
wherein the control unit is configured to correct the digital value with the correction value to acquire the target information.

22. The image forming apparatus according to claim 20, wherein the target information is a value of an AC voltage of an AC power supply,
wherein power to be supplied to the fixing unit is determined based on the value of the AC voltage.

23. The image forming apparatus according to claim 22, wherein the fixing unit comprises a heat generation member,
wherein the target information is a temperature of a heat generation member, and
wherein a temperature of the fixing unit is controlled based on the target information.

* * * * *